United States Patent
Yoshida et al.

(10) Patent No.: US 6,949,317 B2
(45) Date of Patent: Sep. 27, 2005

(54) POLYMER GEL ELECTROLYTE AND SECONDARY CELL

(75) Inventors: Hiroshi Yoshida, Chiba (JP); Kimiyo Hata, Chiba (JP); Tatsuya Maruo, Chiba (JP); Takaya Sato, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 489 days.

(21) Appl. No.: 10/002,171

(22) Filed: Dec. 5, 2001

(65) Prior Publication Data

US 2002/0102464 A1 Aug. 1, 2002

(30) Foreign Application Priority Data

Dec. 6, 2000 (JP) ........................................ 2000-371277

(51) Int. Cl.[7] ................................................ H01M 6/14
(52) U.S. Cl. .................... 429/303; 429/300; 429/231.1; 429/231.4
(58) Field of Search ................................ 429/303, 300, 429/231.1, 231.4

(56) References Cited

U.S. PATENT DOCUMENTS 4,792,504 A    12/1988  Schwab et al.
5,830,600 A    11/1998  Narang et al.
6,015,638 A     1/2000  Ventura et al.

FOREIGN PATENT DOCUMENTS

| EP | 0 787 749 A1 | 8/1997 |
|---|---|---|
| EP | 0 908 905 A2 | 4/1999 |
| EP | 0951085 A1 | 10/1999 |
| JP | 4-184870 | 7/1992 |
| JP | 6-187822 | 7/1994 |
| JP | 8-88023 | 4/1996 |
| JP | 9-306542 | 11/1997 |
| JP | 9-312171 | 12/1997 |
| JP | 10-251401 | 9/1998 |
| JP | 2000-260467 | 9/2000 |

*Primary Examiner*—Laura Weiner
(74) *Attorney, Agent, or Firm*—Birch, Stewart, Kolasch & Birch, LLP

(57) ABSTRACT

A polymer gel electrolyte includes an electrolyte solution composed of a plasticizer with at least two carbonate structures on the molecule and an electrolyte salt, in combination with a matrix polymer. Secondary batteries made with the polymer gel electrolyte can operate at a high capacitance and a high current, have a broad service temperature range and a high level of safety, and are thus particularly well-suited for use in such applications as lithium secondary cells and lithium ion secondary cells. Electrical double-layer capacitors made with the polymer gel electrolyte have a high output voltage, a large output current, a broad service temperature range and excellent safety.

12 Claims, 1 Drawing Sheet

POLYMER GEL ELECTROLYTE AND SECONDARY CELL

BACKGROUND OF THE INVENTION

1. Field of the Invention

Figure 1:
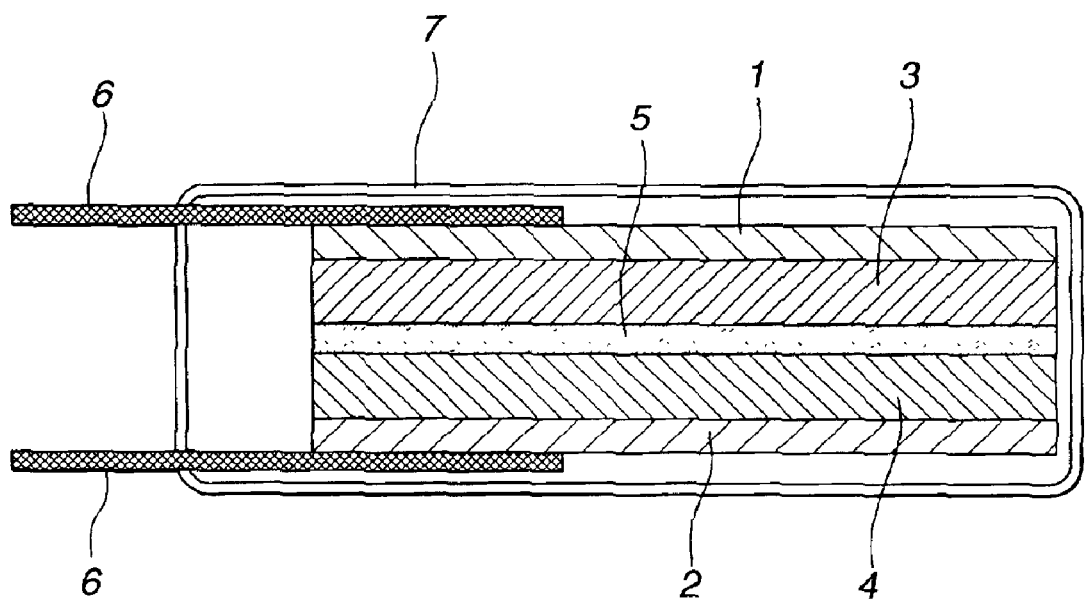

The present invention relates to novel polymer gel electrolytes prepared by solidifying a high-boiling fire-retarding plasticizer, and to secondary cells and electrical double-layer capacitors made using such polymer gel electrolytes.

2. Prior Art

Non-aqueous electrolyte solution-based secondary cells such as lithium secondary cells have attracted much attention in recent years on account of their high voltage and high energy density. The solvent used in such non-aqueous electrolyte solutions is a mixed solvent composed of a cyclic carbonate or lactone having a high dielectric constant and a high viscosity, such as propylene carbonate (PC), ethylene carbonate (EC) or γ-butyrolactone (GBL), in combination with a low-viscosity acyclic carbonate, such as dimethyl carbonate (DMC) or diethyl carbonate (DEC), or a low-viscosity ether such as 1, 2-dimethoxyethane (DME), diglyme or dioxolane.

Further improvements in safety, such as fire retardance and non-flammability, will be needed to attain even higher levels of energy density and output density. Yet, such goals have been very difficult to achieve with existing low-flash-point flammable non-aqueous electrolyte solutions.

A number of solutions have already been proposed, including methods involving the addition of a flame-retarding phosphate to the electrolyte solution (JP-A 4-184870 and JP-A 8-88023) and methods involving the addition of an alkylene carbonate or a halogenated alkylene carbonate to the electrolyte solution (JP-A 9-306542), JP-A 9-312171, JP-A 10-251401, JP-A 12-260467). However, in batteries and electrical double-layer capacitors made with such electrolytes, the supporting electrolyte salt has a poor solubility, resulting in a low ionic conductivity. In addition, undesirable effects such as fluid leakage to the exterior and leaching out of the electrode material tend to arise, compromising the long-term reliability of the battery or capacitor.

By contrast, batteries and electrical double-layer capacitors made with solid electrolytes are free of such problems and offer the additional advantage of being easy to form into a thin shape.

U.S. Pat. No. 4,792,504 describes a method for improving ionic conductivity by using a polymer gel electrolyte prepared by impregnating polyethylene oxide with an electrolyte solution composed of a metal salt and an aprotic solvent, but this polymer gel electrolyte does not have a sufficient ionic conductivity or film strength. To overcome this problem, JP-A 6-187822 discloses an ion-conductive solid polymer electrolyte made with a complex composed of an electrolyte and a polymer that is prepared from a mixture of oxyalkylene group-bearing (meth)acrylate monomers having urethane linkages.

However, a system prepared by gelating a non-aqueous electrolyte which is flammable and has a relatively low flash point is subject to the same service temperature range limitations due to solvent vaporization and gelation as solutions of the non-aqueous electrolyte. In addition, there are problems with polymer gel electrolyte production and with the safety of batteries and electrical double-layer capacitors in which such electrolytes are used.

SUMMARY OF THE INVENTION

It is therefore a first object of the invention to provide a novel polymer gel electrolyte which is endowed with a fire retardance, a service temperature range and stable voltage range that are both broad, and a high ionic conductivity at ambient and low temperatures without compromising such characteristics of devices in which it is used as charge/discharge efficiency, energy density, output density and service life.

A second object of the invention is to provide a secondary cell which can be operated at a high capacity and high current, which has a broad service temperature range, and which has excellent safety by using the foregoing polymer gel electrolyte of the invention.

A third object of the invention is to provide an electrical double-layer capacitor which has a high output voltage, a large output current, a broad service temperature range and excellent safety by using the foregoing polymer gel electrolyte of the invention.

We have found that by using as the electrolyte for secondary cells and electrical double-layer capacitors a polymer gel electrolyte composed of a matrix polymer and an electrolyte solution containing both a plasticizer with at least two carbonate structures on the molecule and an electrolyte salt, it is possible to obtain high-performance secondary cells and electrical double-layer capacitors which have fire retardance, a high ionic conductivity at ambient and low temperatures, and a service temperature range and stable voltage range which are both broad without any loss in such device characteristics as the charge/discharge efficiency, energy density, output density and service life.

Accordingly, in a first aspect, the invention provides a polymer gel electrolyte which is composed of an electrolyte solution containing a plasticizer with at least two carbonate structures on the molecule and an electrolyte salt, and is also composed of a matrix polymer.

Preferably, the polymer gel electrolyte consists essentially of the plasticizer with at least two carbonate structures on the molecule, the electrolyte salt, and the matrix polymer.

In the above-described polymer gel electrolyte, the plasticizer with at least two carbonate structures on the molecule is preferably a compound of general formula (1) below

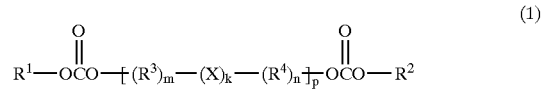

(1)

wherein $R^1$ and $R^2$ are each independently a substituted or unsubstituted monovalent hydrocarbon group of 1 to 10 carbons, and $R^3$ and $R^4$ are each independently a substituted or unsubstituted divalent hydrocarbon group of 1 to 20 carbons, with the proviso that any two of the moieties $R^1$, $R^2$, $R^3$ and $R^4$ may together form a ring; X is —OCO—, —COO—, —OCOO—, —CONR$^5$—, —NR$^6$CO— ($R^5$ and $R^6$ being hydrogen or an alkyl of 1 to 4 carbons), —O— or an arylene group; and the letters m, n, k and p are each independently 0 or an integer from 1 to 10. Some or all of the hydrogen atoms on the plasticizer of general formula (1) having at least two carbonate structures on the molecule are typically substituted with halogen atoms.

In one preferred embodiment of the polymer gel electrolyte according to the first aspect of the invention, the matrix polymer in the polymer gel electrolyte is an unsaturated polyurethane compound prepared by reacting:

(A) an unsaturated alcohol having at least one (meth) acryloyl group and a hydroxyl group on the molecule;

(B) a polyol compound of general formula (2) below

wherein $R^7$ and $R^8$ are each independently a divalent hydrocarbon group of 1 to 10 carbons which may contain an amino, nitro, carbonyl or ether group, Y is —COO—, —OCOO—, —NR$^9$CO— ($R^9$ being hydrogen or an alkyl group of 1 to 4 carbons), —O— or an arylene group, the letters h, i and j are each independently 0 or an integer from 1 to 10, and the letter q is a number which is $\geq 1$;

(C) a polyisocyanate compound; and (D) an optional chain extender.

In another preferred embodiment of the polymer gel electrolyte according to the invention, the matrix polymer is a polymeric material having an interpenetrating network structure or a semi-interpenetrating network structure, and especially one composed of a hydroxyalkyl polysaccharide derivative, a polyvinyl alcohol derivative or a polyglycidol derivative in combination with a crosslinkable functional group-bearing compound, part or all of which compound is the unsaturated polyurethane compound described above.

In yet another preferred embodiment, the matrix polymer is a thermoplastic resin containing units of general formula (3) below

wherein the letter r is an integer from 3 to 5, and the letter s is an integer $\geq 5$.

In still another preferred embodiment, the matrix polymer is a fluoropolymer material.

The electrolyte salt in any of the above polymer gel electrolytes is preferably at least one selected from the group consisting of alkali metal salts, quaternary ammonium salts, quaternary phosphonium salts and transition metal salts.

In a second aspect, the invention provides a secondary cell having a positive electrode, a negative electrode and an electrolyte, which electrolyte is a polymer gel electrolyte according to the above-described first aspect of the invention. The negative electrode preferably includes a negative electrode active material which is lithium, a lithium alloy or a carbon material capable of adsorbing and releasing lithium ions. The positive electrode preferably includes a positive electrode active material which is an electrically conductive polymer, a metal oxide, a metal sulfide or a carbonaceous material.

In a third aspect, the invention provides an electrical double-layer capacitor composed of a pair of polarizable electrodes and an electrolyte between the polarizable electrodes, which electrolyte is a polymer gel electrolyte according to the above-described first aspect of the invention. Preferably, the polarizable electrodes contain activated carbon which is prepared by subjecting a mesophase pitch-based carbon material, a polyacrylonitrile-based carbon material, a gas phase-grown carbon material, a rayon-based carbon material or a pitch-based carbon material to alkali activation with an alkali metal compound, then grinding the activated carbon material.

The polymer gel electrolyte of the invention is composed of an electrolyte solution containing a plasticizer having at least two carbonate structures on the molecule and an electrolyte salt, in combination with a matrix polymer which pseudo-solidifies the electrolyte solution. The plasticizer with at least two carbonate structures on the molecule has the desirable attributes of a low vapor pressure, excellent fire retardance and a high safety. At the same time, it also has drawbacks, including the poor solubility of the supporting electrolyte salt and a low ionic conductivity. We have discovered that a matrix polymer capable of dissolving and holding the supporting electrolyte salt within the polymer chains, when used in combination with the plasticizer, forms a polymer gel electrolyte endowed not only with a low vapor pressure, excellent fire retardance and high safety, but also with a very large degree of ion dissociation and excellent ionic conductivity under both ambient and low temperatures.

In the combination of a plasticizer with a matrix polymer that makes up the polymer gel electrolyte of the invention, the component materials have a high mutual affinity, preventing undesirable effects such as liquid exudation from the gel and re-dissolution. Hence, the gel has a good physical stability and is well-suited for use as the electrolyte in secondary batteries such as lithium secondary cells and lithium ion secondary cells, and in electrical double-layer capacitors.

The combination of a plasticizer and a matrix polymer making up the polymer gel electrolyte of the invention can be employed as all of the polymeric material used between both current collectors in a secondary battery or an electrical double-layer capacitor. That is, it is not limited only to use as an electrolyte film, but is also highly suitable for use as an ion-conductive separator and as a binder polymer in electrode compositions.

Secondary batteries made using the polymer gel electrolyte of the invention can be operated at a high capacity and high current, have a broad service temperature range, and have excellent safety. Moreover, electrical double-layer capacitors made using the inventive polymer gel electrolyte are high-performance devices having a high output voltage, a large output current, a broad service temperature range and excellent safety.

BRIEF DESCRIPTION OF THE DIAGRAM

FIG. 1 is a sectional view of a laminate-type secondary cell or electrical double-layer capacitor according to one embodiment of the invention.

DETAILED DESCRIPTION OF THE INVENTION

The objects, features and advantages of the invention will become more apparent from the following detailed description, taken in conjunction with the foregoing diagram.

Polymer Gel Electrolyte of the Invention:

The polymer gel electrolyte of the invention is composed of an electrolyte solution containing a plasticizer with at least two carbonate structures on the molecule and an electrolyte salt, in combination with a matrix polymer. The use in particular of a polymer gel electrolyte which consists essentially of a plasticizer with at least two carbonate structures on the molecule, an electrolyte salt and a matrix polymer, and which does not contain another non-aqueous electrolyte solution, is preferable for preventing the evolution of gas within the battery or capacitor housing and for enhancing safety.

The plasticizer with at least two carbonate structures on the molecule may be any plasticizer of this type which is liquid within the service temperature range of the secondary battery or electrical double-layer capacitor, although one having a low liquid viscosity and a low vapor pressure is preferred. Plasticizers with a high liquid viscosity are industrially difficult to handle and have a low ionic conductivity. Plasticizers with a high vapor pressure may lead to the evolution of gas within the device housing during use in a secondary battery or an electrical double-layer capacitor, giving rise to safety concerns. Specifically, a plasticizer of the above type which is liquid within a service temperature range of −30 to +120° C., and especially −20 to +100° C., which has a liquid viscosity within this service temperature range of not more than 10 mPa·s, and especially not more than 5 mPa·s, and which has a vapor pressure at 25° C. of not more than 10 mbar, and especially 0 to 10 mbar, is preferred.

The plasticizer with at least two carbonate structures on the molecule is most preferably a compound of general formula (1) below

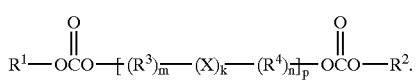

(1)

In the formula, $R^1$ and $R^2$ are each independently a substituted or unsubstituted monovalent hydrocarbon group of 1 to 10, and preferably 1 to 8 carbons. Illustrative examples include alkyls such as methyl, ethyl, propyl, isopropyl, butyl, isobutyl, tert-butyl, pentyl, neopentyl, hexyl, cyclohexyl, octyl, nonyl and decyl; aryls such as phenyl, tolyl and xylyl; aralkyls such as benzyl, phenylethyl and phenylpropyl; alkenyls such as vinyl, allyl, propenyl, isopropenyl, butenyl, hexenyl, cyclohexyl and octenyl; and any of the foregoing groups in which some or all of the hydrogen atoms have been substituted with a halogen (e.g., fluorine, bromine, chlorine), cyano, hydroxyl, $H(OR^{10})_z$— (wherein $R^{10}$ is an alkylene of 2 to 5 carbons, and the letter z is an integer from 1 to 100), amino, aminoalkyl or phosphono, such as cyanobenzyl, cyanoethyl and other cyanated alkyls, chloromethyl, chloropropyl, bromoethyl and trifluoropropyl. Any one or combination of two or more of the above groups may be used, although those groups in which some or all of the hydrogen atoms on $R^1$ and $R^2$ are substituted with halogen atoms (e.g., fluorine, chlorine, bromine) are preferred because the fire retardance can thus be further enhanced.

In above formula (1), $R^3$ and $R^4$ are each independently a substituted or unsubstituted divalent hydrocarbon group of 1 to 20 carbons, preferably a $C_{1-8}$ linear alkylene group, a $C_{6-18}$ alicyclic group-bearing alkylene group or a $C_{6-18}$ aromatic group-bearing alkylene group. The divalent hydrocarbon groups may have an intervening oxygen atom, sulfur atom, carbonyl group, carbonyloxy group, nitrogen-containing group such as NH, $N(CH_3)$ or $N(C_2H_5)$, or $SO_2$ group. Illustrative examples include alkylenes such as methylene, ethylene, trimethylene and propylene; arylenes such as phenylene, tolylene and xylylene; and aralkylenes such as benzylene, phenylethylene and phenylpropylene. Of the foregoing groups, those in which some or all of the hydrogen atoms on these groups are substituted with halogen atoms (e.g., fluorine, bromine, chlorine) are preferred because of the additional enhancement in fire retardance.

Any two of the above moieties $R^1$, $R^2$, $R^3$ and $R^4$ may together form a ring.

In formula (1), X is —OCO—, —COO—, —OCOO—, —CONR$^5$—, NR$^6$CO— ($R^5$ and $R^6$ being independently a hydrogen atom or an alkyl of 1 to 4 carbons), —O— or an arylene group such as phenylene. The letters m, n, k and p are each independently 0 or an integer from 1 to 10.

Examples of such plasticizers having at least two carbonate structures on the molecule includes compounds of the specific formulas shown below. These compounds may be used alone or as combinations of two or more thereof.

$CH_3$—$OCO_2$—$CH_2CH_2$—$OCO_2$—$CH_3$,
$CF_3$—$OCO2$—$CH_2CH_2$—$OC0_2$—$CF_3$,
$CF_3$—$OCO_2$—$CF_2CF_2$—$OCO_2$—$CF_3$,
$C_2H_5$—$OCO_2$—$CH_2CH_2$—$OCO_2$—$C_2H_5$,
$C_2F_5$—$OCO_2$—$CH_2CH_2$—$OCO_2$—$C_2F_5$,
$C_2F_5$—$OCO_2$—$CF_2CF_2$—$OCO_2$—$C_2F_5$,
$C_3H_7$—$OCO_2$—$CH_2CH_2$—$OCO_2$—$C_3H_7$,
$C_3F_7$—$OCO_2$—$CH_2CH_2$—$OCO_2$—$C_3F_7$,
$C_3F_7$—$OCO_2$—$CF_2CF_2$—$OCO_2$—$C_3F_7$,
$C_4H_9$—$OCO_2$—$CH_2CH_2$—$OCO_2$—$C_4H_9$,
$C_4F_9$—$OCO_2$—$CH_2CH_2$—$OCO_2$—$C_4F_9$,
$C_4F_9$—$OCO_2$—$CF_2CF_2$—$OCO_2$—$C_4F_9$,
$C_6H_5$—$OCO_2$—$CH_2CH_2$—$OCO_2$—$C_6H_5$,
$C_6F_5$—$OCO_2$—$CH_2CH_2$—$OCO_2$—$C_6F_5$,
$C_6F_5$—$OCO_2$—$CF_2CF_2$—$OCO_2$—$C_6F_5$,
$C_6H_5CH_2$—$OCO_2$—$CH_2CH_2$—$OCO_2$—$CH_2C_6H_5$,
$C_6F_5CF_2$—$OCO_2$—$CH_2CH_2$—$OCO_2$—$CF_2C_6F_5$,
$C_6F_5CF_2$—$OCO_2$—$CF_2CF_2$—$OCO_2$—$CF_2C_6F_5$,
$CH_3$—$OCO_2$—$CH_2CH_2CH_2$—$OCO_2$—$CH_3$,
$CF_3$—$OCO_2$—$CH_2CH_2CH_2$—$OCO_2$—$CF_3$,
$CF_3$—$OCO_2$—$CF_2CF_2CF_2$—$OCO_2$—$CF_3$,
$C_2H_5$—$OCO_2$—$CH_2CH_2CH_2$—$OCO_2$—$C_2H_5$,
$C_2F_5$—$OCO_2$—$CH_2CH_2CH_2$—$OCO_2$—$C_2F_5$,
$C_2F_5$—$OCO_2$—$CF_2CF_2CF_2$—$OCO_2$—$C_2F_5$,
$C_3H_7$—$OCO_2$—$CH_2CH_2CH_2$—$OCO_2$—$C_3H_7$,
$C_3F_7$—$OCO_2$—$CH_2CH_2CH_2$—$OCO_2$—$C_3F_7$,
$C_3F_7$—$OCO_2$—$CF_2CF_2CF_2$—$OCO_2$—$C_3F_7$,
$C_4H_9$—$OC0_2$—$CH_2CH_2CH_2$—$OCO_2$—$C_4H_9$,
$C_4F_9$—$OCO_2$—$CH_2CH_2CH_2$—$OCO_2$—$C_4F_9$,
$C_4F_9$—$OCO_2$—$CF_2CF_2CF_2$—$OCO_2$—$C_4F_9$,
$C_6H_5$—$OCO_2$—$CH_2CH_2CH_2$—$OCO_2$—$C_6H_5$,
$C_6F_5$—$OCO_2$—$CH_2CH_2CH_2$—$OCO_2$—$C_6F_5$,
$C_6F_5$—$OCO_2$—$CF_2CF_2CF_2$—$OCO_2$—$C_6F_5$,
$C_6H_5CH_2$—$OCO_2$—$CH_2CH_2CH_2$—$OCO_2$—$CH_2C_6H_5$,
$C_6F_5CF_2$—$OCO_2$—$CH_2CH_2CH_2$—$OCO_2$—$CF_2C_6F_5$,
$C_6F_5CF_2$—$OCO_2$—$CF_2CF_2CF_2$—$OCO_2$—$CF_2C_6F_5$,
$CH_3$—$OCO_2$—$CH_2CH_2OCH_2CH_2$—$OCO_2$—$CH_3$,
$CF_3$—$OCO_2$—$CH_2CH_2OCH_2CH_2$—$OCO_2$—$CF_3$,
$CF_3$—$OCO_2$—$CF_2CF_2OCF_2CF_2$—$OCO_2$—$CF_3$,
$C_2H_5$—$OCO_2$—$CH_2CH_2OCH_2CH_2$—$OCO_2$—$C_2H_5$,
$C_2F_5$—$OCO_2$—$CH_2CH_2OCH_2CH_2$—$OCO_2$—$C_2F_5$,
$C_2F_5$—$OCO_2$—$CF_2CF_2OCF_2CF_2$—$OCO_2$—$C_2F_5$,
$C_3H_7$—$OCO_2$—$CH_2CH_2OCH_2CH_2$—$OCO_2$—$C_3H_7$,
$C_3F_7$—$OCO_2$—$CH_2CH_2OCH_2CH_2$—$OCO_2$—$C_3F_7$,
$C_3F_7$—$OCO_2$—$CF_2CF_2OCF_2CF_2$—$OCO_2$—$C_3F_7$,
$C_4H_9$—$OCO_2$—$CH_2CH_2OCH_2CH_2$—$OCO_2$—$C_4H_5$,
$C_4F$ —$OCO_2$—$CH_2CH_2$ $_{OCH2}CH_2$—$OCO_2$—$C_4F_9$,
$C_4F_9$—$OCO_2$—$CF_2CF_2OCF_2CF_2$—$OCO_2$—$C_4F_5$,
$C_6H_5$—$OCO_2$—$CH_2CH_2OCH_2CH_2$—$OCO_2$—$C_6H_5$,
$C_6F_5$—$OCO_2$—$CH_2CH_2OCH_2CH_2$—$OCO_2$—$C_6F_5$,
$C_6F_5$—$OCO_2$—$CF_2CF_2OCF_2CF_2$—$OCO_2$—$C_6F_5$,
$C_6H_5CH_2$—$OCO_2$—$CH_2OCH_2CH_2CH_2$—$OCO_2$—$CH_2C_6H_5$,
$C_6F_5CF_2$—$OCO_2$—$CH_2OCH_2CH_2CH_2$—$OCO_2$—$CF_2C_6F_5$, $C_6F_5CF_2$—$OCO_2$—$CF_2OCF_2CF_2CF_2$—$OCO_2$—$CF_2C_6F_5$,

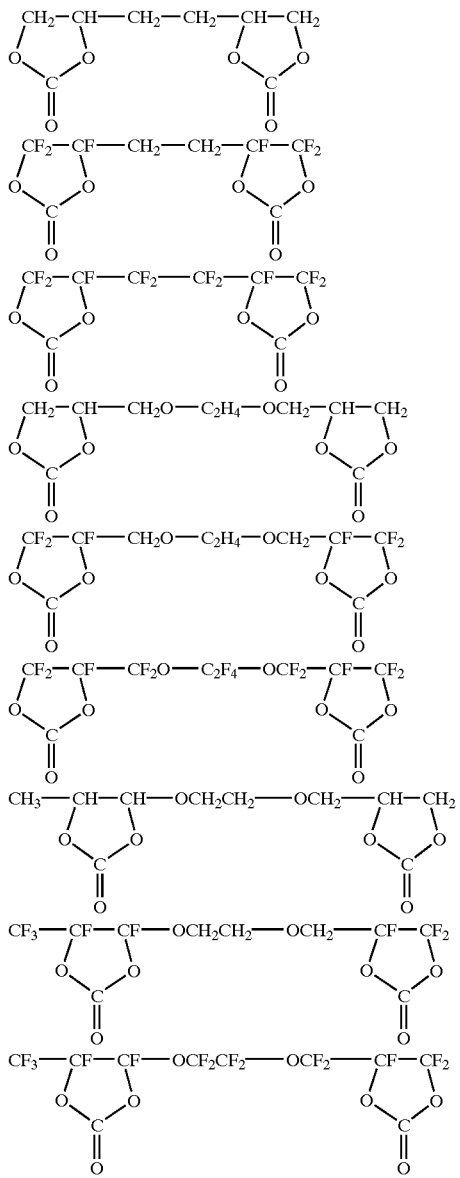

The electrolyte salt serving as a constituent of the electrolyte solution in the invention may be any electrolyte salt, including alkali metal salts and quaternary ammonium salts, that is used in devices such as lithium secondary cells, lithium ion secondary cells and electrical double-layer capacitors. Suitable alkali metal salts include lithium salts, sodium salts and potassium salts, and more specifically:

(1) lithium salts such as lithium tetrafluoroborate, lithium hexafluorophosphate, lithium perchlorate, lithium trifluoromethanesulfonate, the sulfonyl imide lithium salts of general formula (4) below $(R^{11}$—$SO_2)(R^{12}$—$SO_2)NLi$      (4), the sulfonyl methide lithium salts of general formula (5) below $(R^{13}$—$SO_2)(R^{14}$—$SO_2)(R^{15}$—$SO_2)CLi$      (5), lithium acetate, lithium trifluoroacetate, lithium benzoate, lithium p-toluenesulfonate, lithium nitrate, lithium bromide, lithium iodide and lithium tetraphenylborate;

(2) sodium salts such as sodium perchlorate, sodium iodide, sodium tetrafluoroborate, sodium hexafluorophosphate, sodium trifluoromethanesulfonate and sodium bromide;

(3) potassium salts such as potassium iodide, potassium tetrafluoroborate, potassium hexafluorophosphate and potassium trifluoromethanesulfonate.

In above formulas (4) and (5), $R^{11}$ to $R^{15}$ are each independently $C_{1-4}$ perfluoroalkyl groups which may have one or two ether linkages.

Illustrative examples of the sulfonyl imide lithium salts of general formula (4) include $(CF_3SO_2)_2NLi$, $(C_2F_5SO_2)_2NLi$, $(C_3F_7SO_2)_2NLi$, $(C_4F_9SO_2)_2NLi$, $(CF_3SO_2)(C_2F_5SO_2)NLi$, $(CF_3SO_2)(C_3F_7SO_2)NLi$, $(CF_3SO_2)(C_4F_9SO_2)NLi$, $(C_2F_5SO_2)(C_3F_7SO_2)NLi$, $(c_2F_5SO_2)(C_4F_9SO_2)NLi$ and $(CF_3OCF_2SO_2)_2NLi$.

Illustrative examples of the sulfonyl methide lithium salts of general formula (5) include $(CF_3SO_2)_3CLi$, $(C_2F_5SO_2)_3CLi$, $(C_3F_7SO_2)_3CLi$, $(C_4F_9SO_2)_3CLi$, $(CF_3SO_2)_2(C_2F_5SO_2)CLi$, $(CF_3SO_2)_2(C_3F_7SO_2)CLi$, $(CF_3SO_2)_2(C_4F_9SO_2)CLi$, $(CF_3SO_2)(C_2F_5SO_2)_2CLi$, $(CF_3SO_2)(C_3F_7SO_2)_2CLi$, $(CF_3SO_2)(C_4F_9SO_2)_2CLi$, $(C_2F_5SO_2)_2(C_3F_7SO_2)CLi$, $(C_2F_5SO_2)_2(C_4F_9SO_2)CLi$ and $(CF_3OCF_2SO_2)_3CLi$.

Suitable quaternary ammonium salts include tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate; and also acylic amidines, cyclic amidines (e.g., imidazoles, imidazolines, pyrimidines, 1,5-diazabicyclo[4.3.0]non-5-ene (DBN), 1,8-diazabicyclo[5.4.0]undec-7-ene (DBU)), pyrroles, pyrazoles, oxazoles, thiazoles, oxadiazoles, thiadiazoles, triazoles, pyridines, pyrazines, triazines, pyrrolidines, morpholines, piperidines and piperazines.

Of the above electrolyte salts, lithium tetrafluoroborate, lithium hexafluorophosphate, sulfonyl imide lithium salts of general formula (4) and sulfonyl methide lithium salts of general formula (5) are preferred because of their particularly high ionic conductivity and excellent thermal stability. These electrolyte salts may be used singly or as combinations of two or more thereof.

Aside from the above-mentioned electrolyte salts, polymer gel electrolytes to be used in electrical double-layer capacitors may include other electrolyte salts commonly employed in electrical double-layer capacitors. Preferred examples include salts obtained by combining a quaternary onium cation of the general formula $R^{11}R^{12}R^{13}R^{14}N^+$ or $R^{11}R^{12}R^{13}R^{14}P+$ (wherein $R^{11}$ to $R^{14}$ are each independently alkyls of 1 to 10 carbons) with an anion such as $BF_4^-$, $N(CF_3SO_2)_2^-$, $PF_6^-$ or $ClO_4^-$.

Illustrative examples include $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph\text{-}CH_2)PBF_4$ (wherein Ph stands for phenyl), $(C_2H_5)_4PPF_6$, $(C_2H_5)PCF_3SO_2$, $(C_2H_5)_4NBF_4$, $(C_4H_9)_4NBF_4$, $(C_6H_{13})_4NBF_4$, $(C_2H_5)_6NPF_6$, $LiBF_4$ and $LiCF_3SO_3$. These may be used alone or as combinations of two or more thereof.

The concentration of the electrolyte salt in the electrolyte solution is generally 0.05 to 3 mol/L, and preferably 0.1 to 2 mol/L. Too low a concentration may make it impossible to obtain a sufficient ionic conductivity, whereas too high a concentration may prevent complete dissolution in the solvent.

In addition to the above-described plasticizer having at least two carbonate structures on the molecule and the above-described electrolyte salt, the electrolyte solution in the invention may include also a commonly used nonaqueous electrolyte solution insofar as the objects of the invention are not compromised. Examples of such nonaqueous electrolyte solutions include cyclic and acyclic carbonates, acyclic carboxylates, cyclic and acyclic ethers, phosphates, lactone compounds, nitrile compounds and amide compounds, as well as mixtures thereof.

Examples of suitable cyclic carbonates include alkylene carbonates such as propylene carbonate (PC), ethylene carbonate (EC) and butylene carbonate. Examples of suitable acyclic carbonates include dialkyl carbonates such as dimethyl carbonate (DMC), methyl ethyl carbonate (MEC) and diethyl carbonate (DEC). Examples of suitable acyclic carboxylates include methyl acetate and methyl propionate. Examples of suitable cyclic or acyclic ethers include tetrahydrofuran, 1,3-dioxolane and 1,2-dimethoxyethane. Examples of suitable phosphates include trimethyl phosphate, triethyl phosphate, ethyldimethyl phosphate, diethylmethyl phosphate, tripropyl phosphate, tributyl phosphate, tri(trifluoromethyl)phosphate, tri (trichloromethyl)phosphate, tri(trifluoroethyl)phosphate, tri (perfluoroethyl)phosphate, 2-ethoxy-1,3,2-dioxaphosphoran-2-one, 2-trifluoroethoxy-1,3,2-dioxaphosphoran-2-one and 2-methoxyethoxy-1,3,2-dioxaphosphoran-2-one. An example of a suitable lactone compound is γ-butyrolactone. An example of a suitable nitrile compound is acetonitrile. An example of a suitable amide compound is dimethylformamide. Of these, cyclic carbonates, acyclic carbonates, phosphates and mixtures thereof are preferred because they elicit a desirable battery performance such as high charge/discharge characteristics and high output characteristics.

The plasticizer having at least two carbonate structures on the molecule accounts for preferably 10 to 99 wt % of the overall electrolyte solution. For reasons having to do with battery performance (e.g., charge/discharge characteristics), a plasticizer content of 30 to 99 wt % is especially preferred. Too little plasticizer may fail to confer sufficient fire retardance, whereas too much may lower the amount of electrolyte solution for carrying out gelation to such a degree as to make it impossible to achieve a sufficient shape retention and sufficient physical strength in the polymer gel electrolyte.

If necessary, any one or more of various types of compounds, such as polyimides, polyacetanols, polyalkylene sulfides, polyalkylene oxides, cellulose esters, polyvinyl alcohols, polybenzoimidazoles, polybenzothiazoles, silicone glycols, vinyl acetate, acrylic acid, methacrylic acid, polyether-modified siloxanes, polyethylene oxides, amide compounds, amine compounds, phosphoric acid compounds and fluorinated nonionic surfactants, may also be included in the electrolyte solution of the invention for such reasons as to lower the resistance at the interface between the positive and negative electrodes and thereby improve the charge/discharge cycle characteristics or to enhance the wettability with the separator. Of these compounds, fluorinated nonionic surfactants are especially preferred.

The matrix polymer in the polymer gel electrolyte of the invention is preferably one which has a high affinity with the plasticizer and which, even after gelation, does not give rise to liquid exudation and re-dissolution. Examples of such polymers include (I) unsaturated polyurethane compounds, (II) polymeric materials having an interpenetrating network structure or a semi-interpenetrating network structure, (III) thermoplastic resins containing units of above general formula (3), and (IV) fluoropolymer materials.

The use of one of polymeric materials (I) to (III) as the matrix polymer results in a high adhesion, and can therefore increase the physical strength of the polymer gel electrolyte. Polymeric materials having an interpenetrating network structure or a semi-interpenetrating network structure (II) are characterized by a high affinity between the electrolyte solvent molecules and the ionic molecules, a high ion mobility, the ability to dissolve the electrolyte salt to a high concentration, and a high ionic conductivity. Thermoplastic resins (III) which contain units of general formula (3) are thermoplastic and thus can be easily shaped, suitably absorb organic electrolyte solutions and swell, and have a high ionic conductivity. Fluoropolymer materials (IV) have excellent thermal and electrical stability.

The above-described unsaturated polyurethane compounds (I) are preferably ones prepared by reacting:
(A) an unsaturated alcohol having at least one (meth) acryloyl group and a hydroxyl group on the molecule;
(B) a polyol compound of general formula (2) below

(2)

wherein $R^7$ and $R^8$ are each independently a divalent hydrocarbon group of 1 to 10 carbons which may contain an amino, nitro, carbonyl or ether group,
Y is —COO—, —OCOO—, —NR$^9$CO— ($R^9$ being a hydrogen atom or an alkyl group of 1 to 4 carbons), —O— or an arylene group,
the letters h, i and j are each independently 0 or an integer from 1 to 10, and
the letter q is a number which is $\geq 1$;
(C) a polyisocyanate compound; and
(D) an optional chain extender.

The unsaturated alcohol serving as component (A) is not subject to any particular limitation, provided the molecule bears at least one (meth)acryloyl group and a hydroxyl group. Illustrative examples include 2-hydroxyethyl acrylate, 2-hydroxypropyl acrylate, 2-hydroxyethyl methacrylate, 2-hydroxylpropyl methacrylate, diethylene glycol monoacrylate, diethylene glycol monomethacrylate, triethylene glycol monoacrylate and triethylene glycol monomethacrylate.

The polyol compound serving as component (B) may be, for example, a polyether polyol such as polyethylene glycol, polypropylene glycol, polyoxytetramethylene glycol, ethylene glycol-propylene glycol copolymer or ethylene glycol-oxytetramethylene glycol copolymer; or a polyester polyol such as polycaprolactone. A polyol compound of general formula (2) below is especially preferred:

(2).

In the foregoing formula, $R^7$ and $R^8$ are each independently a divalent hydrocarbon group of 1 to 10 carbons, and preferably 1 to 6 carbons, which may contain an amino, nitro, carbonyl or ether group. Alkylene groups such as methylene, ethylene, trimethylene, propylene, ethylene oxide and propylene oxide are especially preferred. Y is —COO—, —OCOO—, —NR$^9$CO— ($R^9$ being a hydrogen atom or an alkyl group of 1 to 4 carbons), —O— or an arylene group such as phenylene. The letters h, i and j are each independently 0 or an integer from 1 to 10. The letter q is a number which is $\geq 1$, preferably $\geq 5$, and most preferably from 10 to 200.

The polyol compound serving as component (B) has a number-average molecular weight of preferably 400 to 10,000, and more preferably 1,000 to 5,000.

Illustrative examples of the polyisocyanate compound serving as component (C) include aromatic diisocyanates such as tolylene diisocyanate, 4,4'-diphenylmethane diisocyanate, p-phenylene diisocyanate, 1,5-naphthylene diisocyanate, 3,3'-dichloro-4,4'-diphenylmethane diisocyanate and xylylene diisocyanate; and aliphatic or alicyclic diisocyanates such as hexamethylene diisocyanate, isophorone diisocyanate, 4,4'-dichlorohexylmethane diisocyanate and hydrogenated xylylene diisocyanate.

The unsaturated polyurethane compound in the invention is preferably one prepared from above components (A) to (C) and also, if necessary, a chain extender. Any chain extender commonly employed in the preparation of thermoplastic polyurethane resins may be used. Illustrative examples include aliphatic diols such as ethylene glycol, diethylene glycol, propylene glycol, 1,3-propanediol, 1,4-butanediol, 1,5-pentanediol, 1,6-hexanediol, 1,7-heptanediol, 1,8-octanediol and 1,9-nonanediol; aromatic or alicyclic diols such as 1,4-bis(β-hydroxyethoxy)benzene, 1,4-cyclohexanediol, bis(β-hydroxyethyl)terephthalate and xylylene glycol; diamines such as hydrazine, ethylenediamine, hexamethylenediamine, propylenediamine, xylylenediamine, isophoronediamine, piperazine, piperazine derivatives, phenylenediamine and tolylenediamine; and amino alcohols such as adipoyl hydrazide and isophthaloyl hydrazide. Any one or combinations of two or more of these may be used.

Use may also be made of a urethane prepolymer prepared by the preliminary reaction of the polyol compound serving as component (B) with the polyisocyanate compound serving as component (C).

In preparing an unsaturated polyurethane compound for use in the invention, it is advantageous to react components (A) to (D) in the following proportions:
(A) 100 parts by weight of the unsaturated alcohol;
(B) 100 to 20,000 parts by weight, and preferably 1,000 to 10,000 parts by weight, of the polyol compound;
(C) 80 to 5,000 parts by weight, and preferably 300 to 2,000 parts by weight, of the polyisocyanate compound; and, optionally,
(D) 5 to 1,000 parts by weight, and preferably 10 to 500 parts by weight, of the chain extender.

Examples of unsaturated polyurethane compounds that can be prepared as described above include the following compounds. Any one or combinations of two or more of these compounds may be used in the present invention.
(1) $CH_2=C(CH_3)COO-C_2H_4O-CONH-C_6H_4-CH_2C_6H_4-NHCOO-[(C_2H_4O)_h-(CH_2CH(CH_3)O)_j]_q-CONH-C_6H_4-CH_2C_6H_4-NHCOO-C_2H_4O-COC(CH_3)=CH_2$ (wherein h is 7, j is 3, and q is 5 to 7)
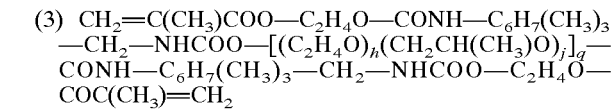
Component (A): hydroxyethyl methacrylate
Component (B): ethylene oxide/propylene oxide random copolymer diol (in general formula (2) above, the ratio h/j is 7/3; the number-average molecular weight is about 3,000)
Component (C): 4,4'-diphenylmethane diisocyanate
(2) $CH_2=C(CH_3)COO-C_2H_4O-CONH-C_6H_4-CH_2C_6H_4-NHCOO-\{[(C_2H_4O)_h(CH_2CH-(CH_3)O)_j]_q-CONH-C_6H_4-CH_2C_6H_4-NHCOO-C_4H_8O\}_r-CONH-C_6H_4-CH_2C_6H_4-NHCOO-C_2H_4O-COC(CH_3)=CH_2$
(wherein h is 7, j is 3, q is 5 to 7, and r is 2 to 20)
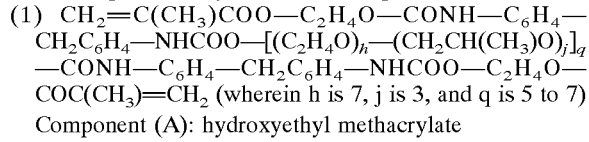
Component (A): hydroxyethyl methacrylate
Component (B): ethylene oxide/propylene oxide random copolymer diol (in general formula (2) above, the ratio h/j is 7/3; the number-average molecular weight is about 3,000)
Component (C): 4,4'-diphenylmethane diisocyanate
Component (D): 1,4-butanediol (3) $CH_2=C(CH_3)COO-C_2H_4O-CONH-C_6H_7(CH_3)_3-CH_2-NHCOO-[(C_2H_4O)_h(CH_2CH(CH_3)O)_j]_q-CONH-C_6H_7(CH_3)_3-CH_2-NHCOO-C_2H_4O-COC(CH_3)=CH_2$
(wherein h is 7, j is 3, and q is 5 to 7)
Component (A): hydroxyethyl methacrylate
Component (B): ethylene oxide/propylene oxide random copolymer diol (in general formula (2) above, the ratio h/j is 7/3; the number-average molecular weight is about 3,000)
Component (C): isophorone diisocyanate
(4) $CH_2=C(CH_3)COO-C_2H_4O-CONH-C_6H_4-CH_2C_6H_4-NHCOO-CH_2CH_2O-(COC_5H_{10}\ O)_s-CH_2CH_2O-CONH-C_6H_4-CH_4C_6H_4-NHCOO-C_2H_4O-COC(CH_3)=CH_2$
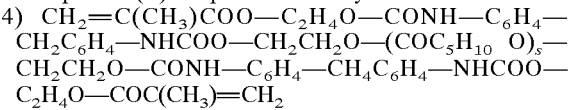
(wherein s is 20 to 30)
Component (A): hydroxyethyl methacrylate
Component (B): polycaprolactone diol (number-average molecular weight, about 3,000)
Component (C): 4,4'-diphenylmethane diisocyanate The resulting unsaturated polyurethane compound has a number-average molecular weight of preferably 1,000 to 50,000, and most preferably 3,000 to 30,000. Too small a number-average molecular weight results in the cured gel having a small molecular weight between crosslink sites, which may result in the polymer gel electrolyte having insufficient flexibility. On the other hand, a number-average molecular weight that is too large may cause the viscosity of the polymer electrolyte solution before the gel cures to become so large as to make the gel difficult to incorporate into a secondary battery or an electrical double-layer capacitor.

In the practice of the invention, concomitant use may also be made of a monomer which is copolymerizable with the unsaturated polyurethane compound. Examples of such monomers include acrylonitrile, methacrylonitrile, acrylic acid esters, methacrylic acid esters and N-vinylpyrrolidone. The concomitant use of acrylonitrile or methacrylonitrile is advantageous for increasing the strength of the film without compromising the ionic conductivity. The monomer component copolymerizable with the unsaturated polyurethane compound is typically included in an amount, expressed in mole equivalents of unsaturated double bond groups per liter of the electrolyte solution prior to curing of the gel, of 0.5 to 5.0, and preferably 1.0 to 2.5. Too little monomer component may fail to produce a sufficient crosslinking reaction, and may in turn fail to result in gelation. On the other hand, too much monomer component may lower the molecular weight between crosslink sites so such as degree as to result in an excessive decline in the flexibility of the polymer gel electrolyte.

The unsaturated polyurethane compound (I) is typically incorporated in an amount of 0.5 to 30 wt %, and preferably 1 to 20 wt %, based on the overall polymer gel electrolyte.

The above-mentioned polymeric material having an interpenetrating network structure or semi-interpenetrating network structure (II) may be composed of two or more compounds, such as polymers or reactive monomers, that are capable of forming a mutually interpenetrating or semi-interpenetrating network structure.

Examples of the two or more compounds include:
(A) matrix polymers formed by combining (a) a hydroxyalkyl polysaccharide derivative with (d) a crosslinkable functional group-bearing compound;
(B) matrix polymers formed by combining (b) a polyvinyl alcohol derivative with (d) a crosslinkable functional group-bearing compound; and (C) matrix polymers formed by combining (c) a polyglycidol derivative with (d) a crosslinkable functional group-bearing compound. Use of the above-described unsaturated polyurethane compound (I) of the invention as part or all of the crosslinkable functional group-bearing compound (d) is advantageous for improving physical strength and other reasons.

Any of the following may be used as the hydroxyalkyl polysaccharide derivative serving as component (a) of above matrix polymer A:
(1) hydroxyethyl polysaccharides prepared by reacting ethylene oxide with a naturally occurring polysaccharide such as cellulose or starch,
(2) hydroxypropyl polysaccharides prepared by similarly reacting instead propylene oxide,
(3) dihydroxypropyl polysaccharides prepared by similarly reacting instead glycidol or 3-chloro-1,2-propanediol. Some or all of the hydroxyl groups on these hydroxyalkyl polysaccharides may be capped with an ester-bonded or ether-bonded substituent.

Illustrative examples of such polysaccharides include cellulose, starch, amylose, amylopectin, pullulan, curdlan, mannan, glucomannan, arabinan, chitin, chitosan, alginic acid, carrageenan and dextran. The polysaccharide is not subject to any particular limitations with regard to molecular weight, the presence or absence of a branched structure, the type and arrangement of constituent sugars in the polysaccharide and other characteristics. The use of cellulose and pullulan is especially preferred, in part because of their ready availability.

A method for synthesizing dihydroxypropyl cellulose is described in U.S. Pat. No. 4,096,326. Other dihydroxypropyl polysaccharides can be synthesized by known methods, such as those described by Sato et al. in *Makromol. Chem.* 193, p. 647 (1992) or in *Macromolecules* 24, p. 4691 (1991).

Hydroxyalkyl polysaccharides that may be used in the invention have a molar degree of substitution of preferably at least 2. At a molar substitution below 2, the ability to dissolve ion-conductive metal salts becomes so low as to make use of the hydroxyalkyl polysaccharide impossible. The upper limit in the molar substitution is preferably 30, and more preferably 20. The industrial synthesis of hydroxyalkyl polysaccharides having a molar substitution greater than 30 can be difficult on account of industrial production costs and the complexity of the synthesis operations. Moreover, even if one does go to the extra trouble of producing hydroxyalkyl polysaccharides having a molar substitution greater than 30, the increase in electrical conductivity resulting from the higher molar substitution is not likely to be very large.

The hydroxyalkyl polysaccharide derivative used as component (a) in the practice of the invention is one in which at least 10% of the terminal OH groups on the molecular chains of the above-described hydroxyalkyl polysaccharide have been capped with one or more monovalent group selected from among halogen atoms, substituted or unsubstituted monovalent hydrocarbon groups, $R^{15}CO-$ groups (wherein $R^{15}$ is a substituted or unsubstituted monovalent hydrocarbon group), $R^{15}{}_3Si-$ groups (wherein $R^{15}$ is the same as above), amino groups, alkylamino groups, $H(OR^{16})_m-$ groups (wherein $R^{16}$ is an alkylene group of 2 to 5 carbons, and the letter m is an integer from 1 to 100), and phosphorus-containing groups.

The above substituted or unsubstituted monovalent hydrocarbon groups are exemplified by the same groups as those mentioned above for $R^1$ and $R^2$, and preferably have 1 to 10 carbons.

The terminal OH groups may be capped using any known method for introducing the respective groups.

The hydroxyalkyl polysaccharide derivative serving as component (a) is typically included in an amount of 0.5 to 30 wt %, and preferably 1 to 20 wt %, based on the overall polymer gel electrolyte.

In the polyvinyl alcohol derivative serving as component (b) of above matrix polymer B, some or all of the hydroxyl groups on the polymeric compound having oxyalkylene chain-bearing polyvinyl alcohol units may be substituted. Here, "hydroxyl groups" refers collectively to remaining hydroxyl groups from the polyvinyl alcohol units and hydroxyl groups on the oxyalkylene-containing groups introduced onto the molecule.

The polymeric compound having polyvinyl alcohol units has an average degree of polymerization of at least 20, preferably at least 30, and most preferably at least 50. Some or all of the hydroxyl groups on the polyvinyl alcohol units are substituted with oxyalkylene-containing groups. The upper limit in the average degree of polymerization is preferably no higher than 2,000, and most preferably no higher than 200. The average degree of polymerization refers herein to the number-average degree of polymerization. Polymeric compounds with too high a degree of polymerization have an excessively high viscosity, making them difficult to handle. Accordingly, the range in the degree of polymerization is preferably from 20 to 500 monomeric units.

These polyvinyl alcohol units make up the mainchain of the polyvinyl alcohol derivative and have the following general formula (6).

(6)

In formula (6), the letter n is at least 20, preferably at least 30, and most preferably at least 50. The upper limit for n is preferably no higher than 2,000, and most preferably no higher than 200.

It is highly advantageous for the polyvinyl alcohol unit-containing polymeric compound to be a homopolymer which satisfies the above range in the average degree of polymerization and in which the fraction of polyvinyl alcohol units within the molecule is at least 98 mol %. However, use can also be made of, without particular limitation, polyvinyl alcohol unit-containing polymeric compounds which satisfy the above range in the average degree of polymerization and have a polyvinyl alcohol fraction of preferably at least 60 mol %, and more preferably at least 70 mol %. Illustrative examples include polyvinylformal in which some of the hydroxyl groups on the polyvinyl alcohol have been converted to formal, modified polyvinyl alcohols in which some of the hydroxyl groups on the polyvinyl alcohol have been alkylated, poly(ethylene vinyl alcohol), partially saponified polyvinyl acetate, and other modified polyvinyl alcohols.

Some or all of the hydroxyl groups on the polyvinyl alcohol units of the polymeric compound are substituted with oxyalkylene-containing groups (moreover, some of the hydrogen atoms on these oxyalkylene groups may be substituted with hydroxyl groups) to an average molar substitution of at least 0.3. The proportion of hydroxyl groups substituted with oxyalkylene-containing groups is preferably at least 30 mol %, and more preferably at least 50 mol %.

The average molar substitution (MS) can be determined by accurately measuring the weight of the polyvinyl alcohol charged and the weight of the reaction product. Let us consider, for example, a case in which 10 g of polyvinyl alcohol (PVA) is reacted with ethylene oxide, and the weight of the resulting PVA derivative is 15 g. The PVA units have the formula —(CH$_2$CH(OH))—, and so their unit molecular weight is 44. In the PVA derivative obtained as the reaction product, the —H groups on the original —(CH$_2$CH(OH))— units have become —O—(CH$_2$CH$_2$O)$_n$—H groups, and so the unit molecular weight of the reaction product is 44+44n. Because the increase in weight associated with the reaction is represented by 44n, the calculation is carried out as follows.

$$\frac{PVA}{PVA \text{ derivative}} = \frac{44}{44+44n} = \frac{10 \text{ g}}{15 \text{ g}}$$

$$440 + 440n = 660$$

$$n = 0.5$$

Hence, the molar substitution in this example is 0.5. Of course, this value merely represents the average molar substitution and does not give any indication of, for example, the number of unreacted PVA units on the molecule or the length of the oxyethylene groups introduced onto the PVA by the reaction.

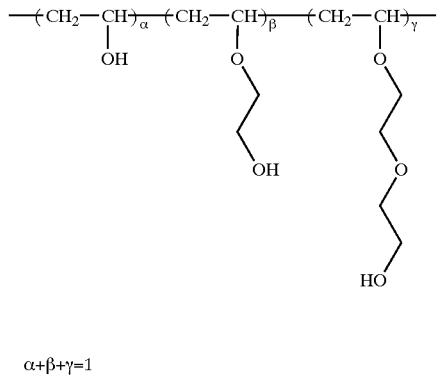

α+β+γ=1

MS=0 unit MS=1 unit MS=2 units $$\text{Average } MS = \frac{0+1+2}{3} = 1$$

Suitable methods for introducing oxyalkylene-containing groups onto the above polyvinyl alcohol unit-containing polymeric compound include (1) reacting the polyvinyl alcohol unit-containing polymeric compound with an oxirane compound such as ethylene oxide, and (2) reacting the polyvinyl alcohol unit-containing polymeric compound with a polyoxyalkylene compound having a hydroxy-reactive substituent on the end.

In above method (1), the oxirane compound may be any one or combination selected from among ethylene oxide, propylene oxide and glycidol.

If ethylene oxide is reacted in this case, oxyethylene chains are introduced onto the polymeric compound as shown in the following formula.

PVA—(CH$_2$CH$_2$O)$_a$—H

In the formula, the letter a is preferably from 1 to 10, and most preferably from 1 to 5.

If propylene oxide is reacted instead, oxypropylene chains are introduced onto the polymeric compound as shown below.

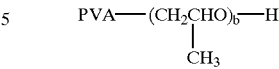

In the formula, the letter b is preferably from 1 to 10, and most preferably from 1 to 5.

And if glycidol is reacted, two branched chains (1) and (2) are introduced onto the compound, as shown below.

Reaction of a hydroxyl group on the PVA with glycidol can proceed in either of two ways: a attack or b attack.

The reaction of one glycidol molecule creates two new hydroxyl groups, each of which can in turn react with glycidol. As a result, the two following branched chains (1) and (2) are introduced onto the hydroxyl groups of the PVA units.

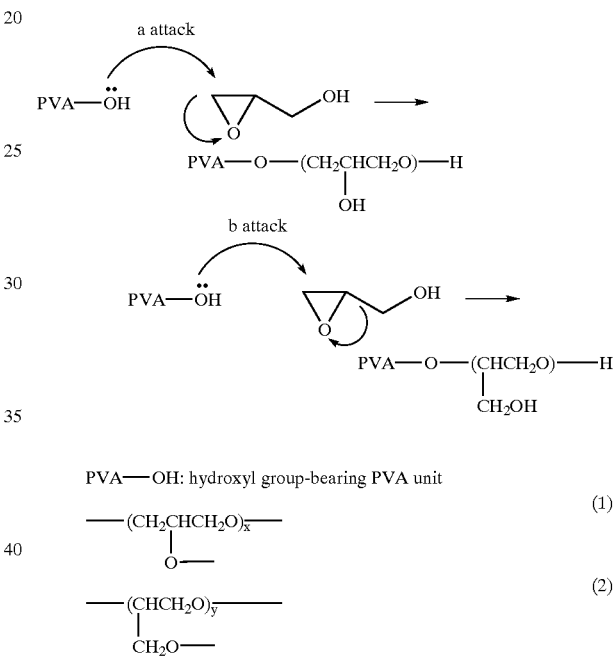

In branched chains (1) and (2), the value x+y is preferably from 1 to 10, and most preferably from 1 to 5. The ratio of x to y is not particularly specified, although x:y generally falls within a range of 0.4:0.6 to 0.6:0.4.

The reaction of the polyvinyl alcohol unit-containing polymeric compound with the above oxirane compound can be carried out using a basic catalyst such as sodium hydroxide, potassium hydroxide or any of various amine compounds.

The reaction of polyvinyl alcohol with glycidol is described for the purpose of illustration. First, the reaction vessel is charged with a solvent and polyvinyl alcohol. It is not essential in this case for the polyvinyl alcohol to dissolve in the solvent. That is, the polyvinyl alcohol may be present in the solvent either in a uniformly dissolved state or in a suspended state. A given amount of a basic catalyst, such as aqueous sodium hydroxide, is added and stirred for a while into the solution or suspension, following which glycidol diluted with a solvent is added. Reaction is carried out at a given temperature for a given length of time, after which the polyvinyl alcohol is removed. If the polyvinyl alcohol is present within the reaction mixture in undissolved form, it is separated off by filtration using a glass filter, for example. If, on the other hand, the polyvinyl alcohol is dissolved within the reaction mixture, it is precipitated out of solution by pouring an alcohol or other suitable precipitating agent into the reaction mixture, following which the precipitate is separated off using a glass filter or the like. The modified polyvinyl alcohol product is purified by dissolution in water, neutralization, and either passage through an ion-exchange resin or dialysis. The purified product is then freeze-dried, giving a dihydroxypropylated polyvinyl alcohol.

In the reaction, the molar ratio between the polyvinyl alcohol and the oxirane compound is preferably 1:10, and most preferably 1:20.

The polyoxyalkylene compound having a hydroxy-reactive substituent at the end used in above method (2) may be a compound of general formula (7) below

$$A-(R^{16}O)_m-R^{15} \qquad (7)$$

In formula (7), the letter A represents a monovalent substituent having reactivity with hydroxyl groups. Illustrative examples include isocyanate groups, epoxy groups, carboxyl groups, acid chloride groups, ester groups, amide groups, halogen atoms such as fluorine, bromine and chlorine, silicon-bearing reactive substituents, and other monovalent substituents capable of reacting with hydroxyl groups. Of these, isocyanate groups, epoxy groups, and acid chloride groups are preferred on account of their reactivity.

The carboxyl group may also be an acid anhydride. Preferred ester groups are methyl ester and ethyl ester groups. Examples of suitable silicon-bearing reactive substituents include substituents having terminal SiH or SiOH groups.

The hydroxy-reactive group, such as isocyanate or epoxy, may be bonded directly to the oxyalkylene group $R^{16}O$ or through, for example, an intervening oxygen atom, sulfur atom, carbonyl group, carbonyloxy group, nitrogenous group (e.g., NH—, $N(CH_3)$—, $N(C_2H_5)$—) or $SO_2$ group. Preferably, the hydroxy-reactive group is bonded to the oxyalkylene group $R^{16}O$ through, for example, an alkylene, alkenylene or arylene group having 1 to 10 carbons, and especially 1 to 6 carbons.

Examples of polyoxyalkylene groups bearing this type of substituent A that may be used are the products obtained by reacting a polyisocyanate compound at the hydroxyl end group on a polyoxyalkylene group. Isocyanate group-bearing compounds that may be used in this case include compounds having two or more isocyanate groups on the molecule, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate. For example, use can be made of compounds obtained from the following reaction.

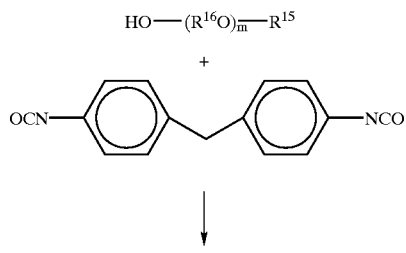

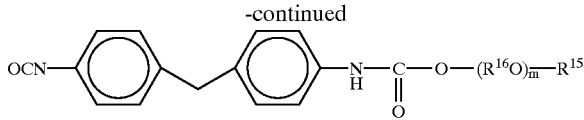

In the formula, $R^{16}O$ is an oxyalkylene group of 2 to 5 carbons, examples of which include —$CH_2CH_2O$—, —$CH_2CH_2CH_2O$—, —$CH_2CH(CH_3)O$—, —$CH_2CH(CH_2CH_3)O$— and —$CH_2CH_2CH_2CH_2O$—. The letter m represents the number of moles of the oxyalkylene group added. This number of added moles (m) is preferably from 1 to 100, and most preferably from 1 to 50.

Here, the polyoxyalkylene chain represented by above formula $(R^{16}O)_m$ is most preferably a polyethylene glycol chain, a polypropylene glycol chain or a polyethylene oxide (EO)/polypropylene oxide (PO) copolymer chain. The weight-average molecular weight of the polyoxyalkylene chain is preferably from 100 to 3,000, and most preferably within the range of 200 to 1,000 at which the compound is liquid at room temperature.

$R^{15}$ in the above formula is a capping moiety for one end of the chain. This represents a hydrogen atom, a substituted or unsubstituted monovalent hydrocarbon group having 1 to 10 carbons, or a $R^{15}CO$— group (wherein $R^{15}$ is a substituted or unsubstituted monovalent hydrocarbon group having 1 to 10 carbons).

Illustrative examples of $R^{15}CO$— groups that may be used as the capping moiety include those in which $R^{15}$ is a substituted or unsubstituted monovalent hydrocarbon group of 1 to 10 carbons. Preferred examples of $R^{15}$ include alkyl or phenyl groups which may be substituted with cyano, acyl groups, benzoyl groups and cyanobenzoyl groups.

The foregoing substituted or unsubstituted monovalent hydrocarbon groups of 1 to 10 carbons are exemplified by the same groups as those mentioned above for $R^1$ and $R^2$. Such groups having 1 to 8 carbons are especially preferred.

The reaction in method (2) between the above-described polyvinyl alcohol unit-containing polymeric compound and the above-described polyoxyalkylene compound having a hydroxy-reactive substituent at the end may be carried out in the same manner as the reaction carried out with an oxirane compound in method (1).

In the reaction, the molar ratio between the polyvinyl alcohol and the polyoxyalkylene compound having a hydroxy-reactive substituent at the end is preferably from 1:1 to 1:20, and most preferably from 1:1 to 1:10.

The structure of the polymeric compound of the invention in which oxyalkylene-containing groups have been introduced onto polyvinyl alcohol units can be verified by $^{13}C$-NMR spectroscopy.

The extent to which the oxyalkylene chain-bearing polyvinyl alcohol unit-containing polymeric compound serving as component (b) of matrix polymer B in the invention contains oxyalkylene groups can be determined in this case using various analytical techniques such as NMR and elemental analysis, although a method of determination based on the weight of the polymer charged as a reactant and the increase in weight of the polymer formed by the reaction is simple and convenient. For example, determination from the yield may be carried out by precisely measuring both the weight of the polyvinyl alcohol unit-containing polymeric compound charged into the reaction and the weight of the oxyalkylene group-bearing polyvinyl alcohol unit-containing polymeric compound obtained from the reaction, then using this difference to calculate the quantity of oxyalkylene chains that have been introduced onto the molecule (referred to hereinafter as the average molar substitution, or "MS").

The average molar substitution serves here as an indicator of the number of moles of oxyalkylene groups that have been introduced onto the molecule per polyvinyl alcohol unit. In the polymeric compound of the invention, the average molar substitution must be at least 0.3, and is preferably at least 0.5, more preferably at least 0.7 and most preferably at least 1.0. No particular upper limit is imposed on the average molar substitution, although a value not higher than 20 is preferred. Too low an average molar substitution may result in a failure of the ion-conductive salt to dissolve, lower ion mobility and lower ionic conductivity. On the other hand, increasing the average molar substitution beyond a certain level fails to yield any further change in the solubility of the ion-conductive salt or ion mobility and is thus pointless.

Depending on its average degree of polymerization, the oxyalkylene chain-bearing polyvinyl alcohol unit-containing polymeric compound used as component (b) varies in appearance at room temperature (20° C.) from a highly viscous molasses-like liquid to a rubbery solid. The higher the average molecular weight, the more the compound, with its low fluidity at room temperature, qualifies as a solid (albeit a soft, paste-like solid).

Regardless of its average degree of polymerization, the polymeric compound serving as component (b) is not a linear polymer. Rather, due to the interlocking of its highly branched molecular chains, it is an amorphous polymer.

The polyvinyl alcohol derivative used as component (b) can be prepared by capping some or all of the hydroxyl groups on the molecule (these being the sum of the remaining hydroxyl groups from the polyvinyl alcohol units and the hydroxyl groups on the oxyalkylene-containing groups introduced onto the molecule), and preferably at least 10 mol %, with one or more monovalent substituent selected from among halogen atoms, substituted or unsubstituted monovalent hydrocarbon groups having 1 to 10 carbons, $R^{15}CO-$ groups (wherein $R^{15}$ is a substituted or unsubstituted monovalent hydrocarbon group of 1 to 10 carbons), $R^{15}_3Si-$ groups ($R^{15}$ being as defined above), amino groups, alkylamino groups and phosphorus-containing groups.

The foregoing substituted or unsubstituted monovalent hydrocarbon groups of 1 to 10 carbons are exemplified by the same groups as those mentioned above for $R^1$ and $R^2$. Such groups having 1 to 8 carbons are especially preferred.

Capping may be carried out using known techniques for introducing various suitable substituents onto hydroxyl end groups.

The polyvinyl alcohol derivative serving as component (b) is typically included in an amount of 0.5 to 30 wt %, and preferably 1 to 20 wt %, based on the overall polymer gel electrolyte.

The polyglycidol derivative serving as component (c) of the earlier-described matrix polymer C is a compound containing units of formula (8) (referred to hereinafter as "A units")

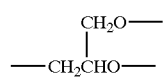

(8)

and units of formula (9) (referred to hereinafter as "B units")

The ends of the molecular chains on the compound are capped with specific substituents.

The polyglycidol can be prepared by polymerizing glycidol or 3-chloro-1,2-propanediol, although it is generally advisable to carry out polymerization using glycidol as the starting material.

Known processes for carrying out such a polymerization reaction include (1) processes involving the use of a basic catalyst such as sodium hydroxide, potassium hydroxide or any of various amine compounds; and (2) processes involving the use of a Lewis acid catalyst (see A. Dworak et al.: *Macromol. Chem. Phys.* 196, 1963–1970 (1995); and R. Toker: *Macromolecules* 27, 320–322 (1994)).

The total number of A and B units in the polyglycidol is preferably at least two, more preferably at least six, and most preferably at least ten. There is no particular upper limit, although a total number of such groups which does not exceed 10,000 is preferred. The total number of A and B units is preferably low in cases where the polyglycidol must have the flowability of a liquid, and is preferably high where a high viscosity is required.

The order of these A and B units is not regular, but random. Any combination is possible, including, for example, -A-A-A, -A-A-B-, -A-B-A-, -B-A-A-, -A-B-B-, -B-A-B-, -B-B-A- and -B-B-B-.

The polyglycidol has a polyethylene glycol equivalent weight-average molecular weight (Mw), as determined by gel permeation chromatography (GPC), within a range of preferably 200 to 730,000, more preferably 200 to 100,000, and most preferably 600 to 20,000. Polyglycidol having a weight-average molecular weight of up to about 2,000 is a highly viscous liquid that flows at room temperature, whereas polyglycidol with a weight-average molecular weight above 3,000 is a soft, paste-like solid at room temperature. The average molecular weight ratio (Mw/Mn) is preferably 1.1 to 20, and most preferably 1.1 to 10.

Depending on its molecular weight, the polyglycidol varies in appearance at room temperature (20° C.) from a highly viscous molasses-like liquid to a rubbery solid. The higher the molecular weight, the more the compound, with its low fluidity at room temperature, qualifies as a solid (albeit a soft, paste-like solid).

Regardless of how large or small its molecular weight, the polyglycidol is not a linear polymer. Rather, due to the interlocking of its highly branched molecular chains, it is an amorphous polymer. This is evident from the wide-angle x-ray diffraction pattern, which lacks any peaks indicative of the presence of crystals.

The ratio of A units to B units in the molecule is within a range of preferably 1/9 to 9/1, and especially 3/7 to 7/3.

Because the polyglycidol is colorless, transparent and nontoxic, it can be used in a broad range of applications, such as a electrochemical material, including binder substances for various active materials (e.g., binders in electroluminescent devices), as a thickener, or as an alkylene glycol substitute.

In the practice of the invention, component (c) of matrix polymer C is a polyglycidol derivative in which at least 10% of the terminal hydroxyl groups on the molecular chains of the above-described polyglycidol are capped with one or more type of monovalent group selected from among halogen atoms, substituted or unsubstituted monovalent hydrocarbon groups, $R^{15}CO-$ groups (wherein $R^{15}$ is a substituted or unsubstituted monovalent hydrocarbon group), $R^{15}_3Si-$ groups (wherein $R^{15}$ is as defined above), amino groups, alkylamino groups, $H(OR^{16})_m-$ groups (wherein $R^{16}$ is an alkylene group of 2 to 5 carbons, and the letter m is an integer from 1 to 100), and phosphorus-containing groups.

The foregoing substituted or unsubstituted monovalent hydrocarbon groups of 1 to 10 carbons are exemplified by the same groups as those mentioned above for $R^1$ and $R^2$. Such groups having 1 to 8 carbons are especially preferred.

Capping may be carried out using known techniques for introducing various suitable substituents onto hydroxyl end groups.

The polyglycidol derivative serving as component (c) is typically included in an amount of 0.5 to 30 wt %, and preferably 1 to 20 wt %, based on the overall polymer gel electrolyte.

Any of the following may be used as the crosslinkable functional group-bearing compound serving as component (d):

(1) an epoxy group-bearing compound in combination with a compound having two or more active hydrogens capable of reacting with the epoxy group;
(2) an isocyanate group-bearing compound in combination with a compound having two or more active hydrogens capable of reacting with the isocyanate group;
(3) a compound having two or more reactive double bonds.

Illustrative examples of the epoxy group-bearing compound (1) include compounds having two or more epoxy groups on the molecule, such as sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl) isocyanurate, glycerol polyglycidyl ether, trimethylpropane polyglycidyl ether, resorcinol diglycidyl ether, 1,6-hexanediol diglycidyl ether, ethylene glycol diglycidyl ether, propylene glycol diglycidyl ether, the diglycidyl ethers of ethylene-propylene glycol copolymers, polytetramethylene glycol diglycidyl ether and adipic acid diglycidyl ether.

A three-dimensional network structure can be formed by reacting the above epoxy group-bearing compound with a compound having at least two active hydrogens, such as an amine, alcohol, carboxylic acid or phenol. Illustrative examples of the latter compound include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)benzene and p-xylylenediol; polyamines such as phenyl diethanolamine, methyl diethanolamine and polyethyleneimine; and polycarboxylic acids.

Illustrative examples of the isocyanate group-bearing compound (2) include compounds having two or more isocyanate groups, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate.

An isocyanato-terminal polyol compound prepared by reacting the above isocyanate compound with a polyol compound can also be used. Such compounds can be prepared by reacting an isocyanate such as diphenylmethane diisocyanate or tolylene diisocyanate with one of the polyol compounds listed below.

In this case, the stoichiometric ratio between the isocyanate groups [NCO] on the isocyanate compound and the hydroxyl groups [OH] on the polyol compound is such as to satisfy the condition [NCO]>[OH]. The ratio [NCO]/[OH] is preferably in a range of 1.03/1 to 10/1, and especially 1.10/1 to 5/1.

Suitable examples of the polyol compound include polymeric polyols such as polyethylene glycol, polypropylene glycol and ethylene glycol-propylene glycol copolymers; and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis-(β-hydroxyethoxy)benzene, p-xylylenediol, phenyl diethanolamine, methyl diethanolamine and 3,9-bis(2-hydroxy-1,1-dimethyl)-2,4,8,10-tetraoxaspiro[5,5]undecane.

Alternatively, instead of the polyol, an amine having two or more active hydrogens may be reacted with the isocyanate. The amine used may be one having a primary or a secondary amino group, although a primary amino group-bearing compound is preferred. Suitable examples include diamines such as ethylenediamine, 1,6-diaminohexane, 1,4-diaminobutane and piperazine; polyamines such as polyethyleneamine; and amino alcohols such as N-methyldiethanolamine and aminoethanol. Of these, diamines in which the functional groups have the same level of reactivity are especially preferred. Here again, the stoichiometric ratio between [NCO] groups on the isocyanate compound and [NH$_2$] and [NH] groups on the amine compound is such as to satisfy the condition [NCO]>[NH$_2$]+[NH].

The above isocyanate group-bearing compound cannot by itself form a three-dimensional network structure. However, a three-dimensional network structure can be formed by reacting the isocyanate group-bearing compound with a compound having at least two active hydrogens, such as an amine, alcohol, carboxylic acid or phenol. Illustrative examples of such compounds having at least two active hydrogens include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)benzene and p-xylylenediol; polyamines such as phenyl diethanolamine, methyl diethanolamine and polyethyleneimine; and polycarboxylic acids.

Illustrative examples of the above reactive double bond-bearing compound (3) which may be used as the crosslinkable functional group-bearing compound serving as component (d) include compounds containing two or more reactive double bonds, such as divinylbenzene, divinylsulfone, allyl methacrylate, ethylene glycol dimethacrylate, diethylene glycol dimethacrylate, triethylene glycol dimethacrylate, polyethylene glycol dimethacrylate (average molecular weight, 200 to 1,000), 1,3-butylene glycol dimethacrylate, 1,6-hexanediol dimethacrylate, neopentyl glycol dimethacrylate, polypropylene glycol dimethacrylate (average molecular weight, 400), 2-hydroxy-1,3-dimethacryloxypropane, 2,2-bis[4-(methacryloxyethoxy)phenyl]propane, 2,2-bis[4-(methacryloxyethoxy-diethoxy)phenyl]propane, 2,2-bis[4-(methacryloxyethoxy-polyethoxy)phenyl]propane, ethylene glycol diacrylate, diethylene glycol diacrylate, triethylene glycol diacrylate, polyethylene glycol diacrylate (average molecular weight, 200 to 1,000), 1,3-butylene glycol diacrylate, 1,6-hexanediol diacrylate, neopentyl glycol diacrylate, polypropylene glycol diacrylate (average molecular weight, 400), 2-hydroxy-1,3-diacryloxypropane, 2,2-bis[4-(acryloxyethoxy)phenyl] propane, 2,2-bis[4-(acryloxyethoxy-diethoxy)phenyl] propane, 2,2-bis[4-(acryloxyethoxy-polyethoxy)phenyl] propane, trimethylolpropane triacrylate, trimethylolpropane trimethacrylate, tetramethylolmethane triacrylate, tetramethylolmethane tetraacrylate, tricyclodecane dimethanol acrylate, hydrogenated dicyclopentadiene diacrylate, polyester diacrylate, polyester dimethacrylate, and the above-described unsaturated polyurethane compounds (I)

If necessary, a compound containing an acrylic or methacrylic group may be added. Examples of such compounds include acrylates and methacrylates such as glycidyl methacrylate, glycidyl acrylate and tetrahydrofurfuryl methacrylate, as well as methacryloyl isocyanate, 2-hydroxymethylmethacrylic acid and N,N-dimethylaminoethylmethacrylic acid. Other reactive double bond-containing compounds may be added as well, such as acrylamides (e.g., N-methylolacrylamide, methylenebisacrylamide, diacetoneacrylamide), and vinyl compounds such as vinyloxazolines and vinylene carbonate.

Here too, in order to form a three-dimensional network structure, a compound having at least two reactive double bonds must be added. That is, a three-dimensional network structure cannot be formed with only compounds such as methyl methacrylate that have but a single reactive double bond. Some addition of a compound bearing at least two reactive double bonds is required.

Of the aforementioned reactive double bond-bearing compounds, especially preferred reactive monomers include the above-described unsaturated polyurethane compounds (I) and polyoxyalkylene component-bearing diesters of general formula (10) below. The use of these in combination with a polyoxyalkylene component-bearing monoester of general formula (11) below is recommended.

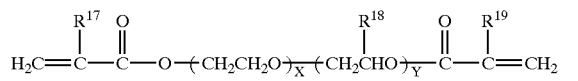

(10)

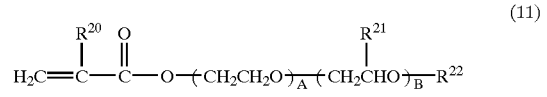

(11)

In formula (10), $R^{17}$, $R^{18}$ and $R^{19}$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and X and Y satisfy the condition $X \geq 1$ and $Y \geq 0$ or the condition $X \geq 0$ and $Y \geq 1$. The sum X+Y is preferably no higher than 100, and especially from 1 to 30. $R^{17}$, $R^{18}$ and $R^{19}$ are most preferably methyl, ethyl, n-propyl, i-propyl, n-butyl, i-butyl, s-butyl or t-butyl.

In formula (11), $R^{20}$, $R^{21}$ and $R^{22}$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and A and B satisfy the condition $A \geq 1$ and $B \geq 0$ or the condition $A \geq 0$ and $B \geq 1$. The sum A+B is preferably no higher than 100, and especially from 1 to 30. $R^{20}$, $R^{21}$ and $R^{22}$ are most preferably methyl, ethyl, n-propyl, i-propyl, n-butyl, i-butyl, s-butyl or t-butyl.

Typically, the above-described unsaturated polyurethane compound (I) or polyoxyalkylene component-bearing diester and the polyoxyalkylene component-bearing monoester are heated or exposed to a suitable form of radiation, such as electron beams, microwaves or radio-frequency radiation, within the polymer electrolyte composition, or a mixture of the compounds is heated, so as to form the three-dimensional network structure.

The three-dimensional network structure can generally be formed by reacting only the above-described unsaturated polyurethane compound (I) or the polyoxyalkylene component-bearing diester. However, as already noted, the addition of a polyoxyalkylene component-bearing monoester, which is a monofunctional monomer, to the unsaturated polyurethane compound or the polyoxyalkylene component-bearing diester is preferred because such addition introduces polyoxyalkylene branched chains onto the three-dimensional network.

No particular limitation is imposed on the relative proportions of the unsaturated polyurethane compound or polyoxyalkylene component-bearing diester and the polyoxyalkylene component-bearing monoester, although a weight ratio (unsaturated polyurethane compound or polyoxyalkylene component-bearing diester)/(polyoxyalkylene component-bearing monoester) within a range of 0.2 to 10, and especially 0.5 to 5, is preferred because this enhances film strength.

The crosslinkable functional group-bearing compound serving as component (d) is typically included in an amount of at least 1 wt %, preferably 5 to 40 wt %, and most preferably 10 to 20 wt %, based on the overall polymer gel electrolyte.

The matrix polymer containing component (a), (b) or (c) in combination with component (d), when heated or exposed to a suitable form of radiation, such as electron beams, microwaves or radio-frequency radiation, forms a semi-interpenetrating polymer network structure in which molecular chains of a polymer of component (a), (b) or (c) are interlocked with the three-dimensional network structure of a polymer formed by the reaction (polymerization) of the crosslinkable functional group-bearing compound serving as component (d).

Thermoplastic resins containing units of general formula (3) below may be used as the above-mentioned type (III) matrix polymer.

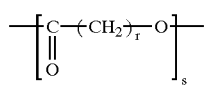

(3)

In the formula, the letter r is an integer from 3 to 5, and the letter s is an integer $\geq 5$.

Such a thermoplastic resin is preferably a thermoplastic polyurethane resin prepared by reacting (E) a polyol compound with (F) a polyisocyanate compound and (G) a chain extender. Suitable thermoplastic polyurethane resins include not only polyurethane resins having urethane linkages, but also polyurethane-urea resins having both urethane linkages and urea linkages.

The polyol compound serving as component (E) above is preferably one prepared by the dehydration or dealcoholation of any of compounds (i) to (vi) below, and most preferably a polyester polyol, a polyester polyether polyol, a polyester polycarbonate polyol, a polycaprolactone polyol, or a mixture thereof:

(i) polyester polyols prepared by the ring-opening polymerization of one or more cyclic ester (lactone);
(ii) polyester polyols prepared by reacting at least one of the above polyester polyols obtained by the ring-opening polymerization of a cyclic ester (lactone) with at least one carboxylic acid and at least one compound selected from the group consisting of dihydric aliphatic alcohols, carbonate compounds, polycarbonate polyols and polyether polyols;

(iii) polyester polyols prepared by reacting at least one carboxylic acid with at least one dihydric aliphatic alcohol;

(iv) polyester polycarbonate polyols prepared by reacting at least one carboxylic acid with at least one polycarbonate polyol;

(v) polyester polyether polyols prepared by reacting at least one carboxylic acid with at least one polyether polyol; and (vi) polyester polyols prepared by reacting at least one carboxylic acid with two or more compounds selected from the group consisting of dihydric aliphatic alcohols, polycarbonate polyols and polyether polyols.

Examples of suitable cyclic esters (lactones) include γ-butyrolactone, δ-valerolactone and ε-caprolactone.

Examples of suitable carboxylic acids include linear aliphatic dicarboxylic acids having 5 to 14 carbons, such as glutaric acid, adipic acid, pimelic acid, suberic acid, azelaic acid, sebacic acid and dodecanedioic acid; branched aliphatic dicarboxylic acids having 5 to 14 carbons, such as 2-methylsuccinic acid, 2-methyladipic acid, 3-methyladipic acid, 3-methylpentanedioic acid, 2-methyloctanedioic acid, 3,8-dimethyldecanedioic acid and 3,7-dimethyldecanedioic acid; aromatic dicarboxylic acids such as terephthalic acid, isophthalic acid and o-phthalic acid; and ester-forming derivatives thereof. Any one or combinations of two or more of the above may be used. Of these, linear or branched aliphatic dicarboxylic acids having 5 to 14 carbons are preferred. The use of adipic acid, azelaic acid or sebacic acid is especially preferred.

Examples of suitable divalent aliphatic alcohols include linear aliphatic diols of 2 to 14 carbons, such as ethylene glycol, 1,3-propanediol, 1,4-butanediol, 1,5-pentanediol, 1,6-hexanediol, 1,7-heptanediol, 1,8-octanediol, 1,9-nonanediol and 1,10-decanediol; branched aliphatic diols of 3 to 14 carbons, including 2-methyl-1,3-propanediol, neopentyl glycol, 3-methyl-1,5-pentanediol and 2-methyl-1,8-octanediol; and alicyclic diols such as cyclohexanedimethanol and cyclohexanediol. Any one or combinations of two or more of the above may be used. Of these, branched or linear aliphatic diols of 4 to 10 carbons are preferred, and 3-methyl-1,5-pentanediol is especially preferred.

Examples of suitable carbonate compounds include dialkyl carbonates such as dimethyl carbonate and diethyl carbonate, alkylene carbonates such as ethylene carbonate, and diaryl carbonates such as diphenyl carbonate.

Suitable polycarbonate polyols include those prepared by a dealcoholation reaction between a polyhydric alcohol and one or more of the above carbonate compounds. Illustrative examples of the polyhydric alcohol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, diethylene glycol and 1,4-cyclohexanedimethanol.

Suitable polyether polyols include polyethylene glycol, polypropylene glycol, ethylene oxide/propylene oxide copolymers and polyoxytetramethylene glycol. Any one or combinations of two or more of these may be used.

The polyol compound serving as component (E) has a number-average molecular weight of preferably 1,000 to 5,000, and most preferably 1,500 to 3,000. A polyol compound having too small a number-average molecular weight may lower the physical properties of the resulting thermoplastic polyurethane resin film, such as the heat resistance and tensile elongation. On the other hand, too large a number-average molecular weight increases the viscosity during synthesis, which may lower the production stability of the thermoplastic polyurethane resin being prepared. The number-average molecular weights used here in connection with polyol compounds are calculated based on the hydroxyl values measured in accordance with JIS K1577.

Illustrative examples of the polyisocyanate compound serving as above component (F) include aromatic diisocyanates such as tolylene diisocyanate, 4,4'-diphenylmethane diisocyanate, p-phenylene diisocyanate, 1,5-naphthylene diisocyanate, 3,3'-dichloro-4,4'-diphenylmethane diisocyanate and xylylene diisocyanate; and aliphatic or alicyclic diisocyanates such as hexamethylene diisocyanate, isophorone diisocyanate, 4,4'-dicyclohexylmethane diisocyanate and hydrogenated xylylene diisocyanate.

The chain extender serving as above component (G) is preferably a low-molecular-weight compound having a molecular weight of not more than 300 and bearing two active hydrogen atoms capable of reacting with isocyanate groups.

Illustrative examples of such low-molecular-weight compounds include aliphatic diols such as ethylene glycol, diethylene glycol, propylene glycol, 1,3-propanediol, 1,4-butanediol, 1,5-pentanediol, 1,6-hexanediol, 1,7-heptanediol, 1,8-octanediol and 1,9-nonanediol; aromatic or alicyclic diols such as 1,4-bis(β-hydroxyethoxy)benzene, 1,4-cyclohexanediol, bis(β-hydroxyethyl)terephthalate and xylylene glycol; diamines such as hydrazine, ethylenediamine, hexamethylenediamine, propylenediamine, xylylenediamine, isophoronediamine, piperazine, piperazine derivatives, phenylenediamine and tolylenediamine; and amino alcohols such as adipoyl hydrazide and isophthaloyl hydrazide. Any one or combinations of two or more of these may be used.

In preparing a thermoplastic polyurethane resin for use in the invention, it is advantageous to react components (E) to (G) in the following proportions:

(E) 100 parts by weight of the polyol compound;
(F) 5 to 200 parts by weight, and preferably 20 to 100 parts by weight, of the polyisocyanate compound;
(G) 1 to 200 parts by weight, and preferably 5 to 100 parts by weight, of the chain extender.

The thermoplastic resin (III) is typically included in an amount of 0.5 to 30 wt %, and preferably 1 to 20 wt %, based on the overall polymer gel electrolyte.

The thermoplastic resin has a swelling ratio, as determined from the formula indicated below, within a range of 150 to 800%, preferably 250 to 500%, and most preferably 250 to 400%.

$$\text{Swelling ratio (\%)} = \frac{\text{weight in grams of swollen, ion-conductive thermoplastic resin composition after 24-hour immersion in electrolyte solution at 20° C. (g)}}{\text{weight in grams of thermoplastic resin before immersion in electrolyte solution (g)}} \times 100.$$

Illustrative examples of fluoropolymer materials that may be used as the above-mentioned type (IV) matrix polymer include polyvinylidene fluoride (PVDF), vinylidene fluoride-hexafluoropropylene (HFP) copolymer (P(VDF-HFP)), vinylidene fluoride-chlorotrifluoroethylene (CTFE)

copolymer (P(VDF-CTFE)), vinylidene fluoride-hexafluoropropylene fluororubber (P(VDF-HFP)), vinylidene fluoride-tetrafluoroethylene-hexafluoropropylene fluororubber (P(VDF-TFE-HFP)) and vinylidene fluoride-tetrafluoroethylene-perfluoro(alkyl vinyl ether) fluororubber. The fluoropolymer has a vinylidene fluoride content of preferably at least 50 wt %, and most preferably at least 70 wt %. The upper limit in the vinylidene fluoride content of the fluoropolymer is preferably about 97 wt %. Of the above fluoropolymers, the use of polyvinylidene fluoride (PVDF), a copolymer of vinylidene fluoride and hexafluoropropylene (P(VDF-HFP)), or a copolymer of vinylidene fluoride and chlorotrifluoroethylene (P(VDF-CTFE)) is preferred.

The fluoropolymer typically has a weight-average molecular weight of at least 500,000, preferably from 500,000 to 2,000,000, and most preferably from 500,000 to 1,500,000. Too low a weight-average molecular weight may result in an excessive decline in physical strength.

The fluoropolymer material is typically included in an amount of 0.5 to 30 wt %, and preferably 1 to 20 wt %, based on the overall polymer gel electrolyte.

Secondary Battery of the Invention:

The secondary battery of the invention includes a positive electrode, a negative electrode and an electrolyte. The polymer gel electrolyte of the invention serves as the battery electrolyte.

The positive electrode is produced by coating one or both sides of a positive electrode current collector with a positive electrode binder composition composed primarily of a binder resin and a positive electrode active material. The positive electrode binder composition composed primarily of a binder resin and a positive electrode active material is melted and blended, then extruded as a film to form a positive electrode.

The binder resin may be any of the above-described matrix polymers (I) to (IV) used in the polymer gel electrolytes of the invention, or another binder resin commonly employed as an electrode binder resin in secondary batteries. Having the binder resin be composed of the same polymeric material as the matrix polymer in the polymer gel electrolyte of the invention is preferable for lowering the internal resistance of the battery.

The positive electrode current collector may be made of a suitable material such as stainless steel, aluminum, titanium, tantalum or nickel. Of these, aluminum is especially preferred both in terms of performance and cost. The current collector used may be in any of various forms, including foil, expanded metal, sheet, foam, wool, or a three-dimensional structure such as a net.

The positive electrode active material is selected as appropriate for the electrode application, the type of battery and other considerations. For instance, examples of positive electrode active materials that are suitable for use in the positive electrode of a lithium secondary cell include group I metal compounds such as CuO, $Cu_2O$, $Ag_2O$, CuS and $CuSO_2$; group IV metal compounds such as TiS, $SiO_2$ and SnO; group V metal compounds such as $V_2O_5$, $V_6O_{13}$, $VO_x$, $Nb_2O_5$, $Bi_2O_3$ and $Sb_2O_3$; group VI metal compounds such as $CrO_3$, $Cr_2O_3$, $MoO_3$, $MoS_2$, $WO_3$ and $SeO_2$; group VII metal compounds such as $MnO_2$ and $Mn_2O_4$; group VIII metal compounds such as $Fe_2O_3$, FeO, $Fe_3O_4$, $Ni_2O_3$, NiO and $CoO_2$; and conductive polymeric compounds such as polypyrrole, polyaniline, poly(p-phenylene), polyacetylene and polyacene.

Suitable positive electrode active materials that may be used in lithium ion secondary cells include chalcogen compounds capable of adsorbing and releasing lithium ions, and lithium ion-containing chalcogen compounds.

Examples of such chalcogen compounds capable of adsorbing and releasing lithium ions include $FeS_2$, $TiS_2$, $MoS_2$, $V_2O_5$, $V_6O_{13}$ and $MnO_2$.

Specific examples of lithium ion-containing chalcogen compounds include $LiCoO_2$, $LiMnO_2$, $LiMn_2O_4$, $LiMo_2O_4$, $LiV_3O_8$, $LiNiO_2$ and $Li_xNi_yM_{1-y}O_2$ (wherein M is at least one metal element selected from among cobalt, manganese, titanium, chromium, vanadium, aluminum, tin, lead and zinc; $0.05 \leq x \leq 1.10$; and $0.5 \leq y \leq 1.0$).

In addition to the binder resin and the positive electrode active material described above, if necessary, the binder composition for the positive electrode may include also an electrically conductive material. Illustrative examples of the conductive material include carbon black, Ketjenblack, acetylene black, carbon whiskers, carbon fibers, natural graphite, and artificial graphite.

The positive electrode binder composition of the invention typically includes 1,000 to 5,000 parts by weight, and preferably 1,200 to 3,500 parts by weight, of the positive electrode active material and 20 to 500 parts by weight, and preferably 50 to 400 parts by weight, of the conductive material per 100 parts by weight of the binder resin.

Because the positive electrode binder composition of the invention provides good bonding of the positive electrode active material particles and has a high adhesion to the positive electrode current collector, a positive electrode can be produced with the addition of only a small amount of binder resin. The high ionic conductivity of the binder composition when swollen with electrolyte solution lowers the internal resistance of the battery.

The above-described positive electrode binder composition is generally used together with a dispersant in the form of a paste. Suitable dispersants include polar solvents such as N-methyl-2-pyrrolidone, dimethylformamide, dimethylacetamide and dimethylsulfamide. The dispersant is typically added in an amount of about 30 to 300 parts by weight per 100 parts by weight of the positive electrode binder composition.

No particular limitation is imposed on the method of shaping the positive electrode as a thin film, although it is preferable to apply the composition by a suitable means such as roller coating with an applicator roll, screen coating, doctor blade coating, spin coating or bar coating so as to form an active material layer having a uniform thickness when dry of 10 to 200 μm, and especially 50 to 150 μm. When the matrix polymer of the inventive polymer gel electrolyte is used as the positive electrode binder resin, the positive electrode may be fabricated by first shaping the electrode as described above, then immersing it in the plasticizer of the invention to induce swelling.

The negative electrode is produced by coating one or both sides of a negative electrode current collector with a negative electrode binder composition composed primarily of a binder resin and a negative electrode active material. The same binder resin may be used as in the positive electrode. The negative electrode binder composition composed primarily of a binder resin and a negative electrode active material is melted and blended, then extruded as a film to form a negative electrode.

The negative electrode current collector may be made of a suitable material such as copper, stainless steel, titanium or nickel. Of these, copper is especially preferred both in terms of performance and cost. The current collector used may be in any of various forms, including foil, expanded metal, sheet, foam, wool, or a three-dimensional structure such as a net.

The negative electrode active material is selected as appropriate for the electrode application, the type of battery and other considerations. Active materials suitable for use in the negative electrode of a lithium secondary cell, for example, include alkali metals, alkali metal alloys, carbonaceous materials, and the same materials as mentioned above for the positive electrode active material.

Examples of suitable alkali metals include lithium, sodium and potassium. Examples of suitable alkali metal alloys include Li—Al, Li—Mg, Li—Al—Ni, Na—Hg and Na—Zn.

Examples of suitable carbonaceous materials include graphite, carbon black, coke, glassy carbon, carbon fibers, and sintered bodies obtained from any of these.

In a lithium ion secondary cell, use may be made of a material which reversibly holds and releases lithium ions. Suitable carbonaceous materials capable of reversibly adsorbing and releasing lithium ions include non-graphitizable carbonaceous materials and graphite materials. Specific examples include pyrolytic carbon, coke (e.g., pitch coke, needle coke, petroleum coke), graphites, glassy carbons, fired organic polymeric materials (materials such as phenolic resins or furan resins that have been carbonized by firing at a suitable temperature), carbon fibers, and activated carbon. Use can also be made of materials capable of reversibly adsorbing and releasing lithium ions, including polymers such as polyacetylene and polypyrrole, and oxides such as $SnO_2$.

In addition to the binder resin and the negative electrode active material described above, if necessary, the binder composition for the negative electrode may include also a conductive material. Illustrative examples of the conductive material include carbon black, Ketjen black, acetylene black, carbon whiskers, carbon fibers, natural graphite, and artificial graphite.

The negative electrode binder composition typically includes 500 to 1,700 parts by weight, and preferably 700 to 1,300 parts by weight, of the negative electrode active material and 0 to 70 parts by weight, and preferably 0 to 40 parts by weight, of the conductive material per 100 parts by weight of the binder resin.

The above-described negative electrode binder composition is generally used together with a dispersant in the form of a paste. Suitable dispersants include polar solvents such as N-methyl-2-pyrrolidone, dimethylformamide, dimethylacetamide and dimethylsulfamide. The dispersant is typically added in an amount of about 30 to 300 parts by weight per 100 parts by weight of the negative electrode binder composition.

No particular limitation is imposed on the method of shaping the negative electrode as a thin film, although it is preferable to apply the composition by a suitable means such as roller coating with an applicator roll, screen coating, doctor blade coating, spin coating or bar coating so as to form an active material layer having a uniform thickness when dry of 10 to 200 $\mu$m, and especially 50 to 150 $\mu$m. When the matrix polymer of the inventive polymer gel electrolyte is used as the negative electrode binder resin, the negative electrode may be fabricated by first shaping the electrode as described above, then immersing it in the plasticizer of the invention to induce swelling.

The separator disposed between the resulting positive and negative electrodes is preferably (1) a separator prepared by impregnating a separator base with a polymer electrolyte solution, then carrying out a chemical reaction to effect curing, or (2) the above-described polymer gel electrolyte of the invention.

Suitable examples of the separator base used in the first type of separator (1) include fluoropolymers, polyethers such as polyethylene oxide and polypropylene oxide, polyolefins such as polyethylene and polypropylene, polyacrylonitrile, polyvinylidene chloride, polymethyl methacrylate, polymethyl acrylate, polyvinyl alcohol, polymethacrylonitrile, polyvinyl acetate, polyvinyl pyrrolidone, polyethyleneimine, polybutadiene, polystyrene, polyisoprene, polyurethane and derivatives of any of the above polymers, as well as cellulose, paper and nonwoven fabric. These may be used singly or as combinations of two or more thereof. A fluoropolymer is especially preferred.

Fluoropolymers that may be used include the fluoropolymer materials described above as type (IV) matrix polymers.

A filler may be added to the separator base. Any suitable filler which forms, together with the polymer making up the separator, a matrix having at the filler-polymer interfaces fine pores in which the electrolyte solution can be impregnated may be used without particular limitation. The filler may be either an inorganic or organic material, and can have a broad range of physical characteristics such as particle shape and size, density and surface state. Exemplary fillers include both inorganic powders such as various oxides, carbonates and sulfates (e.g., silicon dioxide, titanium oxide, aluminum oxide, zinc oxide, calcium carbonate, calcium sulfate, tin oxide, chromium oxide, iron oxide, magnesium oxide, magnesium carbonate and magnesium sulfate), carbides (e.g., silicon carbide, calcium carbide) and nitrides (e.g., silicon nitride, titanium nitride); and organic powders composed of various types of polymer particles that do not form a compatible mixture with the polymer matrix making up the separator.

No particular limitation is imposed on the particle size of the filler, although the particle size is preferably not more than 10 $\mu$m, more preferably from 0.005 to 1 $\mu$m, and most preferably from 0.01 to 0.8 $\mu$m. The amount in which the filler is added to the polymer varies depending on the type of polymer used and the type of filler, although the addition of 5 to 100 parts by weight, and especially 30 to 100 parts by weight, of filler per 100 parts by weight of the polymer is preferred.

Secondary batteries according to the invention are assembled by stacking, fan-folding or winding a cell assembly composed of the positive electrode, the negative electrode, and the separator therebetween, each of which components is prepared as described above, and placing the cell assembly within a battery housing such as a battery can or a laminate pack. The cell assembly is then filled with the polymer electrolyte solution of the invention, and a chemical reaction is carried out to effect curing, following which the battery housing is mechanically sealed if it is a can or heat-sealed if it is a laminate pack.

The resulting secondary batteries of the invention can be operated at a high capacity and a high current without compromising their outstanding performance characteristics, such as an excellent charge/discharge efficiency, high energy density, high output density and long life. The batteries thus are highly suitable in a broad range of applications, particularly as lithium secondary cells and lithium ion secondary cells.

The secondary batteries according to the invention, such as lithium secondary cells and lithium ion secondary cells, are well-suited for use in a broad range of applications, including main power supplies and memory backup power supplies for portable electronic equipment such as camcorders, notebook computers, mobile phones and what are known as "personal handyphone systems" (PHS) in Japan, uninterruptible power supplies for equipment such as personal computers, in transport devices such as electric cars and hybrid cars, and together with solar cells as energy storage systems for solar power generation.

Electrical Double-layer Capacitor of the Invention:

The electrical double-layer capacitor of the invention includes a pair of polarizable electrodes and an electrolyte between the polarizable electrodes. The polymer gel electrolyte of the invention serves as the electrolyte.

The polarizable electrodes are made of a current collector coated with a polarizable electrode binder composition composed primarily of a binder resin and activated carbon. The polarizable electrode binder composition is melted and blended, then extruded as a film to form the polarizable electrodes.

The binder resin may be any of the above-described matrix polymers (I) to (IV) used in the polymer gel electrolytes of the invention, or another binder resin commonly employed as an electrode binder resin in electrical double-layer capacitors. Having the binder resin be the same polymeric material as the matrix polymer in the polymer gel electrolyte of the invention is preferable for lowering the internal resistance of the battery.

Exemplary activated carbons include those manufactured from plant-based materials such as wood, sawdust, coconut shells and pulp spent liquor; fossil fuel-based materials such as coal and petroleum fuel oil, as well as fibers spun from coal or petroleum-based pitch obtained by the thermal cracking of such fossil fuel-based materials or from tar pitch; and synthetic polymers, phenolic resins, furan resins, polyvinyl chloride resins, polyvinylidene chloride resins, polyimide resins, polyamide resins, liquid-crystal polymers, plastic waste and reclaimed tire rubber. These starting materials are carbonized, then activated.

The activated carbon is preferably in the form of a finely divided powder prepared by subjecting a mesophase pitch-based carbon material, a polyacrylonitrile-based carbon material, a gas phase-grown carbon material, a rayon-based carbon material or a pitch-based carbon material to alkali activation with an alkali metal compound, then grinding the activated carbon material. It is especially preferable to use as the fibrous carbonaceous material a mesophase pitch carbon material, a polyacrylonitrile-based carbon material, a gas phase-grown carbon material, a rayon-based carbon material or a pitch-based carbon material.

The use of an activated carbon having a pore size distribution, as determined from a nitrogen adsorption isotherm, in which pores with a radius of up to 10 Å account for at most 70% of the total pore volume makes it possible to obtain activated carbon with an optimal pore size distribution when a nonaqueous electrolyte solution, and especially an organic electrolyte solution, is used. The organic electrolyte solution molecules penetrate fully to the interior of the pores, allowing cations or anions to adsorb efficiently to the surface of the activated carbon and form an electrical double layer, thus making it possible to store a high level of electrical energy.

The pore size distribution of the activated carbon, as determined from a nitrogen adsorption isotherm, is measured by the continuous flow method using nitrogen gas after vacuum outgassing the activated carbon sample. The volume (cc/g) of pores having a radius larger than 10 Å is computed from a desorption isotherm obtained by BJH pore size analysis from a pore distribution plot. The volume (cc/g) of pores with a radius up to 10 Å is computed from an adsorption isotherm obtained by the MP procedure from an MP plot.

In the activated carbon, the volume of pores having a radius up to 10 Å, as determined from a nitrogen adsorption isotherm, accounts for at most 70%, preferably up to 50%, more preferably up to 30%, and most preferably from 0 to 30%, of the total pore volume. If the volume of pores having a radius of up to 10 Å is too great, the overall pore volume of the activated carbon becomes too large and the capacitance per unit volume too small.

The most common pore radius in the pore size distribution of the activated carbon, as determined from a nitrogen adsorption isotherm, is preferably 15 to 500 Å, more preferably 20 to 200 Å, and most preferably 50 to 120 Å. Moreover, in the activated carbon, preferably at least 50%, more preferably at least 60%, even more preferably at least 70%, and most preferably at least 80%, of the pores with a radius greater than 10 Å have a pore radius within a range of 20 to 400 Å. The proportion of pores with a radius greater than 10 Å which have a radius within a range of 20 to 400 Å may even be 100%.

In addition to satisfying the foregoing pore radius conditions, it is advantageous for the activated carbon to have a specific surface area, as measured by the nitrogen adsorption BET method, of 1 to 500 $m^2/g$, preferably 20 to 300 $m^2/g$, more preferably 20 to 200 $m^2/g$, even more preferably 20 to 150 $m^2/g$, and most preferably 50 to 150 $m^2/g$. If the specific surface area of the activated carbon is too small, the surface area of the activated carbon on which the electrical double layer forms becomes smaller than desirable, resulting in a low capacitance. On the other hand, if the specific surface area is too large, the number of micropores and sub-micropores in the activated carbon which are unable to adsorb ionic molecules increases, in addition to which the electrode density decreases, and with it, the capacitance.

The activated carbon has a cumulative average particle size after grinding of preferably at most 20 $\mu$m, more preferably at most 10 $\mu$m, even more preferably at most 5 $\mu$m, and most preferably 0.1 to 5 $\mu$m. It is especially advantageous for the activated carbon to be in the form of fine particles having a cumulative average particle size of up to 5 $\mu$m, and most preferably 0.1 to 5 $\mu$m, which have been formed by subjecting mesophase pitch-based carbon fibers to alkali activation, then grinding the activated fibers.

"Cumulative average particle size," as used herein, refers to the particle size at the 50% point (median size) on the cumulative curve, based on a value of 100% for the total volume of the powder mass, when the particle size distribution of the finely divided activated carbon is determined.

Subjecting the activated carbon to alkali activation followed by grinding allows the cumulative average particle size to be made even smaller. This makes it possible to closely pack the activated carbon into polarizable electrodes for electrical double-layer capacitors, and thereby raise the electrode density. Moreover, compared with fibrous activated carbon, an electrode coating paste composed of the resulting material can be more readily applied to a current collector and press-formed to easily fabricate electrodes of uniform thickness.

The amount of activated carbon included in the binder composition for polarizable electrodes is 500 to 10,000 parts by weight, and preferably 1,000 to 4,000 parts by weight, per 100 parts by weight of the binder resin. The addition of too much activated carbon may lower the bond strength of the binder composition, resulting in poor adhesion to the current collector. On the other hand, too little activated carbon may have the effect of increasing the electrical resistance, and thus lowering the capacitance, of the polarizable electrodes produced with the composition.

In addition to the binder resin and the activated carbon described above, if necessary, the binder composition for polarizable electrodes may include also a conductive material.

The conductive material may be any suitable material capable of conferring electrical conductivity to the binder composition for polarizable electrodes. Illustrative examples include carbon black, Ketjen black, acetylene black, carbon whiskers, carbon fibers, natural graphite, artificial graphite, titanium oxide, ruthenium oxide, and metallic fibers such as aluminum and nickel. Any one or combinations of two or more thereof may be used. Of these, Ketjen black and acetylene black, which are both types of carbon black, are preferred. The average particle size of the conductive material powder is preferably 10 to 100 nm, and especially 20 to 40 nm.

The conductive material is included in an amount of preferably 0 to 300 parts by weight, and especially 50 to 200 parts by weight, per 100 parts by weight of the binder resin. The presence of too much conductive material in the binder composition reduces the proportion of activated carbon, which may lower the capacitance of polarizable electrodes obtained using the composition. On the other hand, too little conductive material may fail to confer adequate electrical conductivity.

The binder composition for polarizable electrodes is generally used together with a diluting solvent in the form of a paste. Suitable diluting solvents include N-methyl-2-pyrrolidone, acetonitrile, tetrahydrofuran, acetone, methyl ethyl ketone, 1,4-dioxane and ethylene glycol dimethyl ether. The diluting solvent is typically added in an amount of about 30 to 300 parts by weight per 100 parts by weight of the binder composition.

No particular limitation is imposed on the method for shaping the polarizable electrodes as thin films, although it is preferable to apply the composition by a suitable means such as roller coating with an applicator roll, screen coating, doctor blade coating, spin coating or bar coating so as to form an activated carbon layer of a uniform thickness after drying of 10 to 500 $\mu$m, and especially 50 to 400 $\mu$m. When the matrix polymer in the polymer gel electrolyte of the invention is used also as the binder resin for the polarizable electrodes, once the polarizable electrodes have been formed as described above, they may be immersed in the plasticizer of the invention to effect swelling and thus give the finished polarizable electrodes.

The separator disposed between the resulting pair of polarizable electrodes is preferably (1) a separator prepared by impregnating a separator base with a polymer electrolyte solution, then carrying out a chemical reaction to effect curing, or (2) the above-described polymer gel electrolyte of the invention.

Suitable examples of the separator base used in the first type of separator (1) include materials commonly used as a separator base in electrical double-layer capacitors. Illustrative examples include polyethylene nonwoven fabric, polypropylene nonwoven fabric, polyester nonwoven fabric, polytetrafluoroethylene porous film, kraft paper, sheet laid from a blend of rayon fibers and sisal fibers, manila hemp sheet, glass fiber sheet, cellulose-based electrolytic paper, paper made from rayon fibers, paper made from a blend of cellulose and glass fibers, and combinations thereof in the form of multilayer sheets.

Electrical double-layer capacitors according to the invention are assembled by stacking, fan-folding or winding an electrical double-layer capacitor assembly composed of a pair of polarizable electrodes with a separator therebetween, each of the components being prepared as described above. The capacitor assembly is formed into a coin-like or laminate shape, then placed within a capacitor housing such as a capacitor can or a laminate pack. The assembly is then filled with the polymer electrolyte solution of the invention, and cured by a chemical reaction, following which the capacitor housing is mechanically sealed if it is a can or heat-sealed if it is a laminate pack.

The resulting high-performance electrical double-layer capacitors of the invention have a high output voltage, a large output current and a broad service temperature range without compromising their outstanding characteristics, such as an excellent charge/discharge efficiency, a high energy density, a high output density and a long life.

The electrical double-layer capacitors of the invention are highly suitable for use in a broad range of applications, including memory backup power supplies for electronic equipment such as personal computers and wireless terminals, uninterruptible power supplies for personal computers and other equipment, in transport devices such as electric cars and hybrid cars, together with solar cells as energy storage systems for solar power generation, and in combination with batteries as load-leveling power supplies.

EXAMPLE

The following synthesis examples, examples of the invention and comparative examples are provided to illustrate the invention, and are not intended to limit the scope thereof.

Synthesis Example 1

Synthesis of Unsaturated Polyurethane Compound

A reactor equipped with a stirrer, a thermometer and a condenser was charged with 870 parts by weight of dehydrated ethylene oxide (EO)/propylene oxide (PO) random copolymer diol (molar ratio of EO/PO=7/3) having a hydroxyl number of 36.1, 107.4 parts by weight of 4,4'-diphenylmethane diisocyanate, and 100 parts by weight of methyl ethyl ketone as the solvent. These ingredients were mixed by 3 hours of stirring at 80° C., giving a polyurethane prepolymer with isocyanate end groups.

Next, the entire reactor was cooled to 50° C., then 0.3 part by weight of benzoquinone, 5 parts by weight of dibutyltin laurate, 16.3 parts by weight of hydroxyethyl acrylate and 6.3 parts by weight of 1,4-butanediol were added, and the ingredients were reacted at 50° C. for 3 hours. The methyl ethyl ketone was subsequently removed under a vacuum, yielding an unsaturated polyurethane compound.

The weight-average molecular weight of the resulting unsaturated polyurethane compound was measured by gel permeation chromatography, and the distributions were found to be 17,300 and 6,200.

Synthesis Example 2

Synthesis of Cellulose Derivative

Eight grams of hydroxypropyl cellulose (molar substitution, 4.65; product of Nippon Soda Co., Ltd.) was suspended in 400 mL of acrylonitrile, following which 1 mL of 4 wt % aqueous sodium hydroxide was added and the mixture was stirred 4 hours at 30° C.

The reaction mixture was then neutralized with acetic acid and poured into a large amount of methanol, giving cyanoethylated hydroxypropyl cellulose.

To remove the impurities, the cyanoethylated hydroxypropyl cellulose was dissolved in acetone, following which the solution was placed in a dialysis membrane tube and purified by dialysis using ion-exchanged water. The cyanoethylated hydroxypropyl cellulose which settled out during dialysis was collected and dried.

Elemental analysis of the resulting cyanoethylated hydroxypropyl cellulose indicated a nitrogen content of 7.3 wt %. Based on this value, the proportion of the hydroxyl groups on the hydroxypropyl cellulose that were capped with cyanoethyl groups was 94%.

Synthesis Example 3

Synthesis of Glycidol Derivative

A glycidol-containing flask was charged with methylene chloride as the solvent to a glycidol concentration of 4.2 mol/L, and the reaction temperature was set at −10° C.

Trifluoroborate diethyl etherate ($BF_3 \cdot OEt_2$) was added as the catalyst (reaction initiator) to a concentration of $1.2 \times 10^{-2}$ mol/L, and the reaction was carried out by stirring for 3 hours under a stream of nitrogen. Following reaction completion, methanol was added to stop the reaction, after which the methanol and methylene chloride were removed by distillation in a vacuum.

The resulting crude polymer was dissolved in water and neutralized with sodium hydrogen carbonate, after which the solution was passed through a column packed with an ion-exchange resin (produced by Organo Corporation under the trade name Amberlite IRC-76). The eluate was passed through 5C filter paper, the resulting filtrate was distilled in vacuo, and the residue from distillation was dried.

The resulting purified polyglycidol was analyzed by gel permeation chromatography (GPC) using 0.1 M saline as the mobile phase, based upon which the polyethylene glycol equivalent weight-average molecular weight was found to be 6,250. Evaluation of the crystallinity by wide-angle x-ray diffraction analysis showed the polyglycidol to be amorphous. The polyglycidol was a soft, paste-like solid at room temperature.

Three parts by weight of the resulting polyglycidol was mixed with 20 parts of dioxane and 14 parts of acrylonitrile. To this mixed solution was added aqueous sodium hydroxide comprising 0.16 part of sodium hydroxide dissolved in 1 part by weight of water, and stirring was carried out for 10 hours at 25° C. to effect the reaction. Following reaction completion, 20 parts of water was added to the mixture, which was then neutralized using an ion-exchange resin (Amberlite IRC-76, produced by Organo Corporation). The ion-exchange resin was separated off by filtration, after which 50 parts by weight of acetone was added to the solution and the insolubles were filtered off. The filtrate was vacuum concentrated, yielding crude cyanoethylated polyglycidol.

The crude cyanoethylated polyglycidol was dissolved in acetone and the solution was filtered using 5A filter paper, then the polyglycidol was precipitated out of solution in water and the precipitate was collected. These two operations (dissolution in acetone and precipitation in water) were repeated twice, following which the product was dried in vacuo at 50° C., giving purified cyanoethylated polyglycidol.

The infrared absorption spectrum of the purified cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. The polyglycidol was a soft, paste-like solid at room temperature.

Synthesis Example 4

Synthesis of Polyvinyl Alcohol Derivative

A reaction vessel equipped with a stirring element was charged with 10 parts by weight of polyvinyl alcohol (average degree of polymerization, 500; vinyl alcohol fraction, $\geq 98\%$) and 70 parts by weight of acetone. A solution of 1.81 parts by weight of sodium hydroxide in 2.5 parts by weight of water was gradually added under stirring, after which stirring was continued for one hour at room temperature.

To this solution was gradually added, over a period of 3 hours, a solution of 67 parts by weight of glycidol in 100 parts by weight of acetone. The resulting mixture was stirred for 8 hours at 50° C. to effect the reaction. Following reaction completion, stirring was stopped, whereupon the polymer precipitated from the mixture. The precipitate was collected, dissolved in 400 parts by weight of water, and neutralized with acetic acid. The neutralized polymer was purified by dialysis, and the resulting solution was freeze-dried, giving 22.50 parts by weight of dihydroxypropylated polyvinyl alcohol.

Three parts by weight of the resulting polyvinyl alcohol polymer was mixed with 20 parts by weight of dioxane and 14 parts by weight of acrylonitrile. To this mixed solution was added a solution of 0.16 part by weight of sodium hydroxide in 1 part by weight of water, and stirring was carried out for 10 hours at 25° C.

The resulting mixture was neutralized using the ion-exchange resin produced by Organo Corporation under the trade name Amberlite IRC-76. The ion-exchange resin was separated off by filtration, after which 50 parts by weight of acetone was added to the solution and the insolubles were filtered off. The resulting acetone solution was placed in dialysis membrane tubing and dialyzed with running water. The polymer which precipitated within the dialysis membrane tubing was collected and re-dissolved in acetone. The resulting solution was filtered, following which the acetone was evaporated off, giving a cyanoethylated polyvinyl alcohol polymer derivative.

The infrared absorption spectrum of this polymer derivative showed no hydroxyl group absorption, confirming that all the hydroxyl groups were capped with cyanoethyl groups (capping ratio, 100%).

Synthesis Example 5

Thermoplastic Polyurethane Resin

A reactor equipped with a stirrer, a thermometer and a condenser was charged with 64.34 parts by weight of preheated and dehydrated polycaprolactone diol (Praccel 220N, made by Daicel Chemical Industries, Ltd.) and 28.57 parts by weight of 4,4'-diphenylmethane diisocyanate. The reactor contents were stirred and mixed for 2 hours at 120° C. under a stream of nitrogen, following which 7.09 parts by weight of 1,4-butanediol was added to the mixture and the reaction was similarly effected at 120° C. under a stream of nitrogen. When the reaction reached the point where the reaction product became rubbery, it was stopped. The reaction product was then removed from the reactor and heated at 100° C. for 12 hours. Once the isocyanate peak was confirmed to have disappeared from the infrared absorption spectrum, heating was stopped, yielding a solid polyurethane resin.

The resulting polyurethane resin had a weight-average molecular weight (Mw) of $1.71 \times 10^5$. The polyurethane resin, when immersed for 24 hours at 20° C. in an electrolyte solution prepared by dissolving 1 mole of $LiPF_6$ as the supporting salt in 1 liter of $C_2H_5$—$OCO_2$—$C_2H_4$—$OCO_2$—$C_2H_5$, had a swelling ratio of 400%.

Example 1

Polymer Gel Electrolyte (1)

An electrolyte solution was prepared by dissolving 1.43 mol/kg of lithium hexafluorophosphate ($LiPF_6$) in $C_2H_5$—$OCO_2$—$C_2H_4$—$OCO_2$—$C_2H_5$.

Next, a polymer electrolyte solution was prepared by adding the following to 70 parts by weight of the above solution: 20 parts by weight of the unsaturated polyurethane compound of Synthesis Example 1, 10 parts by weight of methoxypolyethylene glycol monomethacrylate (number of oxyethylene units=9), and 0.5 part by weight of azobisisobutyronitrile.

The resulting polymer electrolyte solution was coated with a doctor blade to a film thickness of 30 μm, then heated in an incubator at 80° C. for 1 hour to effect curing, thereby yielding a polymer gel electrolyte.

Example 2

Polymer Gel Electrolyte (2)

A polymer electrolyte solution was prepared by the same method as in Example 1, except that a mixture of $C_2H_5$—$OCO_2$—$C_2H_4$—$OCO_2$—$C_2H_5$ and diethyl carbonate in a 1:1 volumetric ratio was used instead of $C_2H_5$—$OCO_2$—$C_2H_4$—$OCO_2$—$C_2H_5$ alone. The solution was similarly cured, yielding a polymer gel electrolyte.

Example 3

Polymer Gel Electrolyte (3)

A polymer electrolyte solution was prepared by the same method as in Example, except that the compound of the formula

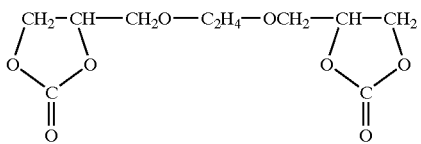

was used instead of $C_2H_5$—$OCO_2$—$C_2H_4$—$OCO_2$—$C_2H_5$. The solution was similarly cured, yielding a polymer gel electrolyte.

Example 4

Polymer Gel Electrolyte (4)

A polymer electrolyte solution was prepared by adding and mixing the following with 70 parts by weight of the electrolyte solution prepared in Example 1:3 parts by weight of the cellulose derivative prepared in Synthesis Example 2, 18 parts by weight of the unsaturated polyurethane compound prepared in Synthesis Example 1, 9 parts by weight of methoxypolyethylene glycol monomethacrylate (number of oxyethylene units=9), and 0.5 part by weight of azobisisobutyronitrile. The resulting polymer electrolyte solution was coated with a doctor blade to a film thickness of 30 μm, then heated in an incubator at 80° C. for 1 hour to effect curing, thereby yielding a polymer gel electrolyte.

Example 5

Polymer Gel Electrolyte (5)

A polymer electrolyte solution was prepared by the same method as in Example 4, except that the polyglycidol derivative prepared in Synthesis Example 3 was used instead of the cellulose derivative prepared in Synthesis Example 2. The solution was similarly cured, yielding a polymer gel electrolyte.

Example 6

Polymer Gel Electrolyte (6)

A polymer electrolyte solution was prepared by the same method as in Example 4, except that the polyvinyl alcohol derivative prepared in Synthesis Example 4 was used instead of the cellulose derivative prepared in Synthesis Example 2. The solution was similarly cured, yielding a polymer gel electrolyte.

Example 7

Polymer Gel Electrolyte (7)

The thermoplastic polyurethane resin solution prepared in Synthesis Example 5 was coated such as to ultimately yield a dry film thickness of 30 μm using a doctor blade, then vacuum dried at 120° C. for 2 hours, thereby forming a polyurethane resin film.

The resulting polyurethane resin film was immersed for 24 hours at 20° C. in an electrolyte solution prepared by dissolving 1 mole of lithium hexafluorophosphate ($LiPF_6$) in one liter of $C_2H_5$—$OCO_2$—$C_2H_4$—$OCO_2$—$C_2H_5$, thereby preparing a polymer gel electrolyte.

Example 8

Polymer Gel Electrolyte (8)

Aside from using a 1 mol/kg solution of tetraethylammonium tetrafluoroborate in $C_2H_5$—$OCO_2$—$C_2H_4$—$OCO_2$—$C_2H_5$ instead of a 1 mol/kg solution of lithium hexafluorophosphate ($LiPF_6$) in $C_2H_5$—$OCO_2$—$C_2H_4$—$OCO_2$—$C_2H_5$, a polymer electrolyte solution was prepared in the same manner as in Example 4. The solution was similarly cured, yielding a polymer gel electrolyte.

Comparative Example 1

Polymer Gel Electrolyte (9)

Aside from using ethylene carbonate and diethylene carbonate in a 50:50 volumetric ratio instead of $C_2H_5$—$OCO_2$—$C_2H_4$—$OCO_2$—$C_2H_5$, a polymer electrolyte solution was prepared in the same way as in Example 4. The solution was similarly cured, yielding a polymer gel electrolyte.

Each of the polymer gel electrolytes obtained in the foregoing examples was subjected to the combustion test described below, in addition to which its ionic conductivity was measured. The results are shown in Table 1.

<Combustion Test>

Pieces of manila paper measuring 1.5 cm wide, 30 cm long and 0.04 mm thick intended for use as separators were immersed 5 minutes in the polymer electrolyte solution being tested, then removed and liquid dripping from the paper was wiped off. The pieces of paper were then heated in an incubator at 80° C. for 1 hour, yielding polymer gel electrolyte films in which the manila paper served as the medium. The individual polymer gel electrolyte films were pinned on supporting wires at 5 cm intervals and thereby horizontally secured. One end of a polymer gel electrolyte film was ignited with a lighter in a draft-free state, following which the flame was allowed to self-extinguish. The burn distance (cm) and burn rate (cm/s) of the polymer gel electrolyte film were measured. Each of the values shown in the table below is the average of three measurements.

<Ionic Conductivity>

The polymer gel electrolyte film was placed between two copper sheets separated by a 30 μm gap and the ionic conductivities at −10° C. and 25° C. were measured by the AC impedance method.

TABLE 1

|  | Burn distance (cm) | Burn rate (cm/sec) | Ionic conductivity (mS/cm) −10° C. | Ionic conductivity (mS/cm) 25° C. |
| --- | --- | --- | --- | --- |
| Example 1 | 0.8 | 0.2 | 1.3 | 3.8 |
| Example 2 | 2.5 | 0.4 | 1.1 | 3.5 |
| Example 3 | 1.0 | 0.3 | 1.1 | 3.5 |
| Example 4 | 0.8 | 0.2 | 1.8 | 4.4 |
| Example 5 | 0.7 | 0.2 | 2.2 | 4.7 |
| Example 6 | 0.8 | 0.2 | 2.0 | 4.5 |
| Example 7 | 0.6 | 0.2 | 2.7 | 4.4 |
| Example 8 | 0.6 | 0.2 | 1.2 | 4.2 |
| Comparative Example 1 | 30 | 0.8 | 0.8 | 3.1 |

Example 9

Secondary Battery
Fabrication of Positive Electrode

Ninety parts by weight of $LiCoO_2$ as the positive electrode active material, 6 parts by weight of Ketjenblack as the conductive material, and a solution of 8 wt % of the thermoplastic polyurethane resin from Synthesis Example 5 in N-methyl-2-pyrrolidone were stirred and mixed to give a paste-like positive electrode binder composition. The composition was coated onto aluminum foil with a doctor blade such as to ultimately yield a dry film thickness of 100 μm, then dried at 80° C. for 2 hours to form a positive electrode.

Fabrication of Negative Electrode

Ninety-four parts by weight of mesocarbon microbeads (MCMB6-28, produced by Osaka Gas Chemicals Co., Ltd.) as the negative electrode active material and a solution of 8 wt % of the thermoplastic polyurethane resin from Synthesis Example 5 in N-methyl-2-pyrrolidone were stirred and mixed to give a paste-like negative electrode binder composition. The composition was coated onto copper foil with a doctor blade such as to ultimately yield a dry film thickness of 100 μm, then dried at 80° C. for 2 hours to form a negative electrode.

A separator base (a film having a three-layer PP/PE/PP structure) was placed between the positive and negative electrodes fabricated above. The resulting cell assembly was inserted in an aluminum laminate outer pack, following which the interior of the laminate pack was evacuated so as to bring the laminate material up tight against the cell assembly. Next, the polymer electrolyte solution of Example 4 was introduced into the cell assembly via a needle passing through a hole in the pack. The laminate pack was subsequently sealed and heated at 80° C. for 1 hour to effect curing via a chemical reaction, thereby giving a laminate-type secondary battery having the construction shown in FIG. 1. Included in the diagram are a positive electrode current collector 1, a negative electrode current collector 2, a positive electrode 3, a negative electrode 4, a separator 5, tabs 6, and a laminate outer pack 7.

The laminate-type secondary battery produced in Example 9 was subjected to a 50-cycle charge/discharge test in which the upper limit voltage during charging was set at 4.2 V, the final voltage during discharging was set at 3 V, and the test was carried out at a constant current under a current density of 0.5 $mA/cm^2$.

Following completion of the charge/discharge test, the laminate-type secondary battery was free of any sign of electrolyte leakage or battery pack swelling due to gas evolution. Moreover, the capacitance before and after the 50 cycles remained unchanged, indicating an absence of cycle deterioration.

Example 10

Electrical Double-layer Capacitor (1)
Fabrication of Polarizable Electrodes

Eighty-five parts by weight of activated carbon (MSP15, produced by Kansai Netsukagaku K.K.), 10 parts by weight of acetylene black, and a solution of 8 wt % of the thermoplastic polyurethane resin from Synthesis Example 5 in N-methyl-2-pyrrolidone were stirred and mixed to give a paste-like polarizable electrode binder composition. The composition was coated onto aluminum foil with a doctor blade such as to ultimately yield a dry film thickness of 200 μm, then dried at 80° C. for 2 hours to form polarizable electrodes.

A separator base (polytetrafluoroethylene) was placed between a pair of the polarizable electrodes fabricated above. The resulting capacitor assembly was inserted in an aluminum laminate outer pack, following which the interior of the laminate pack was evacuated so as to bring the laminate material up tight against the capacitor assembly. Next, the polymer electrolyte solution of Example 8 was introduced into the capacitor assembly via a needle passing through a hole in the pack. The laminate pack was subsequently sealed and heated at 80° C. for 1 hour to effect curing via a chemical reaction, thereby giving a laminate-type electrical double-layer capacitor having the construction shown in FIG. 1.

The laminate-type electrical double-layer capacitor produced in Example 10 was subjected to a 50-cycle charge/discharge test in which the upper limit voltage during charging was set at 2.5 V, the final voltage during discharging was set at 0 V, and the test was carried out at a constant current under a current density of 1.5 $mA/cm^2$.

Following completion of the charge/discharge test, the laminate-type electrical double-layer capacitor was free of any sign of electrolyte leakage or battery pack swelling due to gas evolution. Moreover, the capacitance before and after the 50 cycles remained unchanged, indicating an absence of cycle deterioration.

Example 11

Electrical Double-layer Capacitor (2)
Fabrication of Activated Carbon

Mesophase pitch with a Mettler softening point of 285° C. prepared by the heat treatment of residual oil from the cracking of petroleum was melt-blow spun using a spinneret having a row of one thousand 0.2 mm diameter holes in a 2 mm wide slit, thereby producing pitch fibers.

The spun pitch fibers were drawn by suction against the back side of a belt made of 35 mesh stainless steel wire fabric and thereby collected on the belt. The resulting mat of pitch fibers was subjected to infusibilizing treatment in air at an average temperature rise rate of 4° C./min, yielding infusibilized fibers. The infusibilized fibers were then subjected to carbonization treatment in nitrogen at 700° C., following which they were milled to an average particle size of 25 μm in a high-speed rotary mill.

Next, 2 to 4 parts by weight of potassium hydroxide was added to and uniformly mixed with 1 part by weight of the milled carbon fiber, and alkali activation was carried out at 700° C. for 2 to 4 hours in a nitrogen atmosphere. The resulting reaction product was cooled to room temperature and placed in isopropyl alcohol, then washed with water to neutrality and dried.

The dried carbonaceous material was ground in a ball mill, thereby yielding activated carbon having a cumulative average particle size of 2.4 μm. In the resulting activated carbon, pores having a radius greater than 10 Å accounted for 70% of the total pore volume and the BET specific surface area was 90 m²/g.

Fabrication of Polarizable Electrodes

Eighty-five parts by weight of activated carbon, 10 parts by weight of acetylene black, and a solution of 8 wt % of the thermoplastic polyurethane resin from Synthesis Example 5 in N-methyl-2-pyrrolidone were stirred and mixed to give a paste-like polarizable electrode binder composition. The composition was coated onto aluminum foil with a doctor blade such as to ultimately yield a dry film thickness of 200 μm, then dried at 80° C. for 2 hours to form polarizable electrodes.

A separator base (polytetrafluoroethylene) was placed between a pair of the polarizable electrodes fabricated above. The resulting capacitor assembly was inserted in an aluminum laminate outer pack, following which the interior of the laminate pack was evacuated so as to bring the laminate material up tight against the capacitor assembly. Next, the polymer electrolyte solution of Example 8 was introduced into the capacitor assembly via a needle passing through a hole in the pack. The laminate pack was subsequently sealed and heated at 80° C. for 1 hour to effect curing via a chemical reaction, thereby giving a laminate-type electrical double-layer capacitor having the construction shown in FIG. 1.

The laminate-type electrical double-layer capacitor produced in Example 11 was subjected to a 50-cycle charge/discharge test in which the upper limit voltage during charging was set at 2.5 V, the final voltage during discharging was set at 0 V, and the test was carried out at a constant current under a current density of 1.5 mA/cm².

Following completion of the charge/discharge test, the laminate-type electrical double-layer capacitor was free of any sign of electrolyte leakage or battery pack swelling due to gas evolution. Moreover, the capacitance before and after the 50 cycles remained unchanged, indicating an absence of cycle deterioration.

The foregoing results show that the polymer gel electrolytes of the invention have a good thin-film strength and good temperature properties, and also have a high ionic conductivity. With this combination of desirable qualities, the polymer gel electrolyte was found to exhibit excellent characteristics when used in secondary batteries and electrical double-layer capacitors.

Therefore, as described above and demonstrated in the foregoing examples, the invention provides secondary batteries which can operate at a high capacitance and a high current, which have a broad service temperature range and a high level of safety, and which are thus particularly well-suited for use in such applications as lithium secondary cells and lithium ion secondary cells.

The invention also provides electrical double-layer capacitors which have a high output voltage, a large output current, a broad service temperature range, and excellent safety.

Japanese Patent Application No. 2000-371277 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A polymer gel electrolyte comprising:

an electrolyte solution containing a plasticizer with at least two carbonate structures on the molecule and an electrolyte salt, and a matrix polymer, wherein the matrix polymer is an unsaturated polyurethane compound prepared by reacting:

(A) an unsaturated alcohol having at least one (meth)acryloyl group and a hydroxyl group on the molecule; and (B) a polyol compound of general formula (2) below

$$HO\text{---}[(R^7)_h\text{---}(Y)_i\text{---}(R^8)_j]_q\text{---}OH \qquad (2)$$

wherein $R^7$ and $R^8$ are each independently a divalent hydrocarbon group of 1 to 10 carbons which may contain an amino, nitro, carbonyl or ether group, Y is —COO—, —OCOO—, —NR⁹CO— (R⁹ being hydrogen or an alkyl group of 1 to 4 carbons), —O— or an arylene group, the letters h, i and j are each independently 0 or an integer from 1 to 10, and the letter q is a number which is ≧1;

(C) a polyisocyanate compound; and (D) an optional chain extender.

2. A polymer gel electrolyte comprising:

an electrolyte solution containing a plasticizer with at least two carbonate structures on the molecule and an electrolyte salt, and a matrix polymer, wherein the matrix polymer is a polymeric material having an interpenetrating network structure or a semi-interpenetrating network structure, wherein the polymeric material having an interpenetrating network structure or a semi-interpenetrating network structure comprises a hydroxyalkyl polysaccharide derivative, a polyvinyl alcohol derivative or a polyglycidol derivative in combination with a crosslinkable functional group-bearing compound, part or all of which compound is an unsaturated polyurethane compound prepared by reacting:

(A) an unsaturated alcohol having at least one (meth)acryloyl group and a hydroxyl group on the molecule; and (B) a polyol compound of general formula (2) below

$$HO\text{---}[(R^7)_h\text{---}(Y)_i\text{---}(R^8)_j]_q\text{---}OH \qquad (2)$$

wherein $R^7$ and $R^8$ are each independently a divalent hydrocarbon group of 1 to 10 carbons which may contain an amino, nitro, carbonyl or ether group, Y is —COO—, —OCOO—, —NR⁹CO— (R⁹ being hydrogen or an alkyl group of 1 to 4 carbons), —O— or an arylene group, the letters h, i and j are each independently 0 or an integer from 1 to 10, and the letter g is a number which is $\geq 1$;

(C) a polyisocyanate compound; and (D) an optional chain extender.

3. A polymer gel electrolyte comprising:

an electrolyte solution containing a plasticizer with at least two carbonate structures on the molecule and an electrolyte salt, and a matrix polymer, wherein the matrix polymer as a thermoplastic polyurethane containing units of general formula (3) below

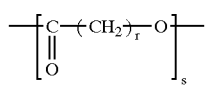
(3)

in which the letter r is an integer from 3 to 5, and the letter s is an integer $\geq 5$.

4. The polymer gel electrolyte of claim 3, wherein the thermoplastic polyurethane resin is a resin prepared by reacting a polyol compound with a PolYisocyanate compound and a chain extender, wherein the polyol compound is a polyester polyol, a polyester polyether polyol, a polyester polycarbonate polyol, a polycaprolactone polyol, or a mixture thereof.

5. The polymer gel electrolyte of claim 1, 2 or 3 which consists essentially of the plasticizer with at least two carbonate structures on the molecule, the electrolyte salt, and the matrix polymer.

6. The polymer gel electrolyte of claim 5 in which the plasticizer with at least two carbonate structures on the molecule is a compound of general formula (1) below

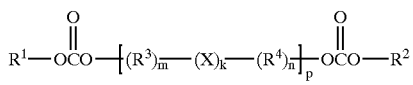
(1)

wherein $R^1$ and $R^2$ are each independently a substituted or unsubstituted monovalent hydrocarbon group of 1 to 10 carbons, and $R^3$ and $R^4$ are each independently a substituted or unsubstituted divalent hydrocarbon group of 1 to 20 carbons, with the proviso that any two of the moieties $R^1$, $R^2$, $R^3$ and $R^4$ may together form a ring; X is —OCO—, —COO—, —OCOO—, —CONR$^5$—, —NR$^6$CO— ($R^5$ and $R^6$ being hydrogen or an alkyl of 1 to 4 carbons), —O— or an arylene group; and the letters m, n, k and p are each independently 0 or an integer from 1 to 10.

7. The polymer gel electrolyte of claim 1, 2 or 3 in which the plasticizer with at least two carbonate structures on the molecule is a compound of general formula (1) below

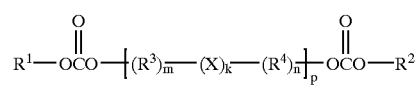
(1)

wherein $R^1$ and $R^2$ are each independently a substituted or unsubstituted monovalent hydrocarbon group of 1 to 10 carbons, and $R^3$ and $R^4$ are each independently a substituted or unsubstituted divalent hydrocarbon group of 1 to 20 carbons, with the proviso that any two of the moieties $R^1$, $R^2$, $R^3$ and $R^4$ may together form a ring; X is —OCO—, —COO—, —OCOO—, —CONR$^5$—, —NR$^6$CO— ($R^5$ and $R^6$ being hydrogen or an alky of 1 to 4 carbons), —O— or an arylene group; and the letters m, n, k and p are each independently 0 or an integer from 1 to 10.

8. The polymer gel electrolyte of claim 7, wherein some or all of the hydrogen atoms on the plasticizer of general formula (1) having at least two carbonate structures on the molecule are substituted with halogen atoms.

9. The polymer gel electrolyte of claim 1, 2 or 3, wherein the electrolyte salt is at least one selected from the group consisting of alkali metal salts, quaternary ammonium salts, quaternary phosphonium salts and transition metal salts.

10. A secondary cell comprising a positive electrode, a negative electrode and an electrolyte, wherein the electrolyte is a polymer gel electrolyte according to claim 1, 2 or 3.

11. The secondary cell of claim 10, wherein the negative electrode includes a negative electrode active material which is lithium, a lithium alloy or a carbon material capable of adsorbing and releasing lithium ions.

12. The secondary cell of claim 10, wherein the positive electrode includes a positive electrode active material which is an electrically conductive polymer, a metal oxide, a metal sulfide or a carbonaceous material.

* * * * *